US010597507B2

(12) United States Patent
DiMondo et al.

(10) Patent No.: US 10,597,507 B2
(45) Date of Patent: Mar. 24, 2020

(54) POLYMER-MODIFIED ASPHALT WITH WAX ADDITIVE

(71) Applicant: GreenMantra Recycling Technologies Ltd., Brantford (CA)

(72) Inventors: Domenic DiMondo, Brampton (CA); Chris Guillon, Brantford (CA)

(73) Assignee: GreenMantra Recycling Technologies Ltd., Brantford (CA)

( * ) Notice: Subject to any disclaimer, the term of this patent is extended or adjusted under 35 U.S.C. 154(b) by 3 days.

(21) Appl. No.: 16/101,430

(22) Filed: Aug. 11, 2018

(65) Prior Publication Data
US 2018/0346683 A1 Dec. 6, 2018

Related U.S. Application Data

(63) Continuation of application No. PCT/CA2017/050172, filed on Feb. 13, 2017.

(60) Provisional application No. 62/295,035, filed on Feb. 13, 2016.

(51) Int. Cl.
| | |
|---|---|
| *C08J 11/16* | (2006.01) |
| *C08J 3/00* | (2006.01) |
| *C08J 3/20* | (2006.01) |
| *C08L 95/00* | (2006.01) |
| *C08J 11/12* | (2006.01) |
| *C08L 91/06* | (2006.01) |
| *C08J 11/10* | (2006.01) |

(52) U.S. Cl.
CPC ............... *C08J 11/16* (2013.01); *C08J 3/005* (2013.01); *C08J 3/20* (2013.01); *C08J 11/10* (2013.01); *C08J 11/12* (2013.01); *C08L 91/06* (2013.01); *C08L 95/00* (2013.01); *C08J 2300/30* (2013.01); *C08J 2323/02* (2013.01); *C08J 2323/16* (2013.01); *C08J 2395/00* (2013.01); *C08J 2491/06* (2013.01); *C08L 2555/34* (2013.01)

(58) Field of Classification Search
USPC .......................................................... 521/47
See application file for complete search history.

(56) References Cited

U.S. PATENT DOCUMENTS

| | | | |
|---|---|---|---|
| 3,143,536 | A | 8/1964 | Guzzetta et al. |
| 3,332,926 | A | 7/1967 | Baron et al. |
| 3,345,352 | A | 10/1967 | Baron et al. |
| 3,424,822 | A | 1/1969 | Liston |
| 3,441,628 | A | 4/1969 | Raetzsch et al. |
| 3,927,693 | A | 12/1975 | Johnston |
| 4,053,141 | A | 10/1977 | Gussefeld |
| 4,105,806 | A | 8/1978 | Watt |
| 4,136,251 | A | 1/1979 | Bice et al. |
| 4,208,252 | A | 6/1980 | Yoshkida et al. |
| 4,642,401 | A | 2/1987 | Coenen et al. |
| 4,847,209 | A | 7/1989 | Lewis et al. |
| 5,158,982 | A | 10/1992 | Stapp |
| 5,314,741 | A | 5/1994 | Roberts et al. |
| 5,315,055 | A | 5/1994 | Butcher et al. |
| 5,354,930 | A | 10/1994 | Atkins et al. |
| 5,369,215 | A | 11/1994 | Platz |
| 5,386,055 | A | 1/1995 | Lee et al. |
| 5,481,052 | A | 1/1996 | Hardman et al. |
| 5,502,263 | A | 3/1996 | Ponsford et al. |
| 5,656,757 | A | 8/1997 | Jenczewski et al. |
| 5,672,794 | A | 9/1997 | Northemann |
| 5,728,909 | A | 3/1998 | Butcher, Jr. |
| 5,731,483 | A | 3/1998 | Stabel et al. |
| 5,821,395 | A | 10/1998 | Price et al. |
| 5,849,964 | A | 12/1998 | Holighaus et al. |
| 6,143,940 | A | 11/2000 | Miller et al. |
| 6,150,577 | A | 11/2000 | Miller et al. |
| 6,172,271 | B1 | 1/2001 | Horizoe et al. |
| 6,172,275 | B1 | 1/2001 | Tadauchi et al. |

(Continued)

FOREIGN PATENT DOCUMENTS

| | | |
|---|---|---|
| CA | 2098778 A1 | 12/1993 |
| CA | 2202941 A1 | 10/1998 |

(Continued)

OTHER PUBLICATIONS

Tordella et al., "Isomorphic Interactions of Ethylenic Polymers and Paraffin Wax", J. of Polymer Science, vol. 8, 1970, pp. 81-87.
Mpanza et al., "Influence of Different Waxes on the Physical Properties of Linear Low-density Polyethylene", South Africa J. of Chem., vol. 59, 2006, pp. 48-54.
Urbaniak et al. "Waxes—Products of Thermal Degradation of Waste Plastics—Obtaining, Capabilities, and Application", Archives of Waste Management and Environmental Protection, vol. 6, 2007, pp. 71-78.

(Continued)

*Primary Examiner* — Terressa Boykin
(74) *Attorney, Agent, or Firm* — Cook Alex Ltd.; Ryan Truesdale

(57) ABSTRACT

An improved method forms and employs a wax to modify asphalt. The method includes: (a) selecting a solid polymeric material, (b) heating the solid polymeric material in an extruder to produce a molten polymeric material, (c) filtering the molten polymeric material, (d) placing the molten polymeric material through a chemical depolymerization process in a reactor to produce a depolymerized polymeric material, and (e) adding the depolymerized material to a pre-wax mixture to produce a polymer-modified asphalt. The addition of wax reduced the mixing time necessary to achieve improved polymer dispersion compared to the control formulation modified bitumen and reduced the viscosity of the neat bitumen. Pre-polymer addition of wax is detrimental to most properties of the resulting modified asphalt. Post-polymer addition improved viscosity reduction, higher softening point and improved dimensional stability.

20 Claims, 10 Drawing Sheets

(56) References Cited

U.S. PATENT DOCUMENTS

| | | |
|---|---|---|
| 6,184,427 B1 | 2/2001 | Klepfer et al. |
| 6,288,296 B1 | 11/2001 | Miller et al. |
| 6,822,126 B2 | 11/2004 | Miller et al. |
| 7,834,226 B2 | 11/2010 | Miller |
| 7,893,307 B2 | 2/2011 | Smith |
| 8,168,839 B2 | 5/2012 | Niu |
| 8,664,458 B2 | 3/2014 | Kumar et al. |
| 9,200,130 B2 | 12/2015 | D'Amato et al. |
| 10,000,715 B2 | 6/2018 | Kumar et al. |
| 2003/0003554 A1 | 1/2003 | Miller et al. |
| 2003/0199718 A1 | 10/2003 | Miller |
| 2005/0148487 A1 | 7/2005 | Brownscombe et al. |
| 2007/0263060 A1 | 11/2007 | Laksin et al. |
| 2010/0227954 A1 | 9/2010 | Naidoo et al. |
| 2010/0233408 A1 | 9/2010 | Zickell et al. |
| 2011/0195256 A1 | 8/2011 | Morikawa et al. |
| 2012/0016169 A1 | 1/2012 | Kumar |
| 2012/0310023 A1 | 5/2012 | Huang et al. |
| 2012/0304879 A1 | 12/2012 | Tiessen et al. |
| 2013/0303810 A1 | 11/2013 | Handerek |
| 2014/0046102 A1 | 2/2014 | D'Amato et al. |
| 2014/0182194 A1 | 7/2014 | Unger et al. |
| 2014/0299017 A1 | 10/2014 | Parvez et al. |
| 2015/0210611 A1 | 7/2015 | Tippet et al. |
| 2015/0247096 A1 | 9/2015 | Barger et al. |
| 2015/0361374 A1 | 12/2015 | Kumar et al. |
| 2016/0024390 A1 | 1/2016 | Ullom |
| 2016/0040074 A1 | 2/2016 | Methling |
| 2019/0119191 A1* | 4/2019 | Streiff ................. C07C 51/16 |

FOREIGN PATENT DOCUMENTS

| | | | |
|---|---|---|---|
| CA | 2805570 | A1 | 1/2012 |
| CA | 2822678 | A1 | 2/2014 |
| CA | 2898257 | A1 | 7/2014 |
| CA | 2885144 | A1 | 3/2015 |
| CA | 2890874 | A1 | 11/2015 |
| CA | 2822678 | C | 5/2017 |
| CH | 646717 | A5 | 12/1984 |
| CN | 1120347 | A | 4/1996 |
| CN | 101434821 | B | 5/2009 |
| CN | 103168016 | A | 4/2015 |
| CN | 104877699 | A | 9/2015 |
| CN | 107629565 | A | 1/2018 |
| DE | 1570194 | A1 | 8/1969 |
| DE | 3642273 | A1 | 4/1987 |
| DE | 19500425 | C1 | 4/1996 |
| DE | 69323125 | T2 | 8/1999 |
| DE | 10037229 | A1 | 2/2000 |
| DE | 10022666 | A1 | 11/2001 |
| EP | 0577279 | A1 | 1/1994 |
| EP | 0717094 | A1 | 6/1996 |
| EP | 0577279 | B1 | 1/1999 |
| EP | 1707614 | A1 | 10/2006 |
| EP | 2161299 | A1 | 3/2010 |
| GB | 569043 | A | 5/1945 |
| GB | 1310260 | A | 3/1973 |
| GB | 1563440 | A | 3/1980 |
| JP | H0457887 | A | 2/1992 |
| JP | H05085964 | A | 4/1993 |
| JP | H06179877 | A | 6/1994 |
| JP | H08508520 | A | 9/1996 |
| JP | H08253601 | A | 10/1996 |
| JP | H122000512209 | A | 9/2000 |
| JP | H142002167466 | A | 6/2002 |
| JP | H142002224652 | A | 8/2002 |
| JP | H142002256103 | A | 9/2002 |
| JP | H162004131675 | A | 4/2004 |
| JP | H172005170986 | A | 6/2005 |
| JP | H172005200573 | A | 7/2005 |
| JP | H172005527672 | A | 9/2005 |
| JP | H182006056957 | A | 3/2006 |
| JP | H182006143802 | A | 6/2006 |
| JP | H192007529574 | A | 10/2007 |
| WO | 2000027942 | A1 | 5/2000 |
| WO | 2005092963 | A1 | 10/2005 |
| WO | 2010099963 | A1 | 9/2010 |
| WO | WO 2010099963 | A1 | 9/2010 |
| WO | 2012007833 | A2 | 7/2011 |
| WO | WO 2012007833 | A2 | 1/2012 |
| WO | 2014110644 | A1 | 7/2014 |
| WO | WO 2014110644 | A1 | 7/2014 |
| WO | 201461767 | A2 | 10/2014 |
| WO | WO 2014161767 | A2 | 10/2014 |
| WO | 2015130545 | A1 | 9/2015 |
| WO | WO 2015130545 | A1 | 9/2015 |
| WO | 2015164331 | A1 | 10/2015 |
| WO | WO 2015164331 | A1 | 10/2015 |
| WO | 2017113020 | A1 | 7/2017 |
| WO | WO 2017113020 | A1 | 7/2017 |
| WO | 2017136957 | A1 | 8/2017 |
| WO | 2017139333 | A1 | 8/2017 |
| WO | WO 2017136957 | A1 | 8/2017 |
| WO | WO 2017139333 | A1 | 8/2017 |
| WO | 2017161463 | A1 | 9/2017 |
| WO | WO 2017161463 | A | 9/2017 |
| WO | 2018058257 | A1 | 4/2018 |

OTHER PUBLICATIONS

Shang et al., "Pyrolyzed Wax from Recycled Cross-Linked Polyethylene as Warm Mix Asphalt (WMA) Additive for Sbs Modified Asphalt", Construction and Building Materials, vol. 25, 2011, pp. 886-891.

"SCRA Spinout Case Study—Recycling Technologies", Sep. 2015, pp. 1-3, Retrieved from the Internet: https://warwick.ac.uk/fac/crossfac/sciencecity/casestudies/recycling-tecnnologies/ [retrieved on Aug. 22, 2019].

"Changing the Story of Waste Plastic (Crowdcube presentation)", Feb. 2018, Retrieved from the Internet: https://hkstartupresources.com/wp-content/uploads/2018/02/recycling-technologies-ltd-business-plan.pdf [retrieved on Aug. 22, 2019].

Extended European Search Report dated Aug. 23, 2019 issued in connection with European application No. 16880228.8.

Extended European Search Report dated Sep. 4, 2019 issued in connection with European application No. 17769226.6.

Notice of Acceptance issued in connection with Australian application No. 2018204945 dated Sep. 6, 2019.

Gergo, P. et al. "Rheological Investigation of Rubber Bitumen Containing Various Waxes as Warm Mix Additive" Studia Ubb Chemia LXII, 2 Tom II, 2017 p. 247-257.

International Search Report and Written Opinion dated Jul. 4, 2019 in connection with International Application No. PCT/CA2019/000046.

International Search Report and Written Opinion dated Jul. 12, 2019 in connection with International Application No. PCT/CA2019/050762.

International Search Report and Written Opinion dated Jul. 26, 2019 in connection with International Application No. PCT/CA2019/050761.

Requena et al., "Encapsulation of Leu-Enkephalin in core-shell isobutylcyanoacrylate-thiolated chitosan nanoparticles for oral administration", J. Chilean Chem. Soc., 2008, vol. 53(4), pp. 1677-1681.

Kaitz et al., "Depolymerizable polymers: preparation, applications, and future outlook", MRS Comm., 2015, vol. 5, pp. 191-204.

International Search Report and Written Opinion dated Feb. 5, 2019 in connection with International application No. PCT/CA2018/051517.

Yu, Peroxide modified polyolefin blends Part 1: Effects on Ldpeipp blends with components with similar initial viscosities, Adv. Polymer Tech., 10(3), (1990), pp. 163-172.

Teh, A Review of polyethylene-polypropylene blend and their compatibilization, Adv. Polymer Tech., 13(1), (1994), pp. 1-23.

Murty et al., Thermal Degradation Hydrogenation of Commodity Plastics and Characterization of their Liquefaction Products, Fuel Processing Technology, Oct.-Dec. 1996, pp. 75-90, vol. 49, Issues 1-3.

(56) References Cited

OTHER PUBLICATIONS

Ding et al., Thermal and catalytic degradation of high density polyethylene and commingled post-consumer plastic waste, Fuel Processing Technology, Mar. 1997, pp. 47-62, vol. 51, Issues 1-2.
Uddin et al., Catalytic Degradation of Polyethylene and Polypropylene into Liquid Hydrocarbons with Mesoporous Silica, Microporous and Mesoporous Materials, May 1998, pp. 557-564, vol. 21, Issues 4-6.
Buekens et al., Catalytic plastics cracking for recovery of gasoline-range hydrocarbons from municipal plastic wastes, Resources, Conservation and Recycling, Aug. 1998, pp. 163-181, vol. 23, Issue 3.
Luo et al., Catalytic degradation of high density polyethylene and polypropylene into liquid fuel in a power-particle fluidized bed, Polymer Degradation and Stability, online Aug. 21, 2000; pp. 97-102, vol. 70, Issue 1.
Predel, "Pyrolysis of mixed polyolefins in a fluidised-bed reactor and on a pyro-GCMS to yield aliphatic waxes"; Polymer Degradation and Stability, vol. 70, No. 3 (2000); pp. 373-385.
You et al., Liquid-phase catalytic degradation of polyethylene wax over silica modified zeolite catalysts, Polymer Degradation and Stability, May 2001, pp. 329-336, vol. 265, Issue 2.
Seo et al., Investigation of Catalytic degradation of HDPE by hydrocarbon group type analysis, Journal of Analytical and Applied Pyrolysis, online Jan. 21, 2003, pp. 97-102, vol. 70, Issue 2.
Lai et al., Depolymerization of HDPE to wax in the presence of a catalyst formed by homonuclear macrocyclic zirconium complex chemically bonded to alumina support, Journal of Molecular Applied Catalysis A: General, Apr. 18, 2006, pp. 9-17, vol. 303, Issue 1.
Lai et al., Development of heterogeneous catalyst by ionically bonding macrocyclic Zr—Zr complex to montmorillonite clay for depolymerization of polypropylene, Journal of Molecular Applied Catalysis A: Chemical, Apr. 16, 2007, pp. 15-24, vol. 265, Issues 1-2.
Aboulkas, Thermal degradation behaviors of polyethylene and polypropylene. Part 1: pyroloysis kinetics and mechanisms, Energy Conversion and Management, vol. 51, (2010), pp. 1363-1369.
Arabiourrutia, "Characterization of the waxes obtained by the pyrolysis of polyolefin plastics in a conical spouted bed reactor"; Journal of Analytical and Applied Pyrolysis, vol. 94 (2012); pp. 230-237.
Xanthos, Recycling of the #5 polymer, Science, vol. 337, (2012), pp. 700-702.
European Search Report dated Apr. 4, 2011 in connection to European Patent Application No. 10172039.
Extended European Search Report dated Apr. 15, 2011 in connection to European Patent Application No. 10172039.9-2104.
International Search Report and Written Opinion dated Jan. 5, 2012 in connection to International Patent Application No. PCTIB2011001642.
International Preliminary Report on Patentability dated Aug. 1, 2012, in connection to International Application No. PCTIB2011001642.
International Search Report and Written Opinion dated Sep. 20, 2013 in connection to International Application No. PCTCA2013000041.
Office Action dated Apr. 4, 2014 in connection to Chinese Application No. 201180034887.0.
Office Action dated on Jun. 16, 2015 in connection to Japanese Application No. 2013-519172.
International Preliminary Report on Patentability dated Jul. 21, 2015 in connection to International Application PCTCA2013000041.
Office Action dated Oct. 15, 2015 in connection to Malaysian Patent Application No. 2013000128.
Office Action dated Feb. 29, 2016 in connection to Chinese Application No. 201510126290.9.
Office Action dated Oct. 5, 2016 in connection to Canadian Application No. 2805570.
Office Action dated Oct. 6, 2016 in connection to Canadian Application No. 2898257.

International Search Report and Written Opinion dated Mar. 17, 2017 in connection to International PCTCA2016051555.
International Search Report and Written Opinion dated May 2, 2017 in connection with PCT/CA2017/050172.
Office Action dated Nov. 30, 2017 in connection to Indian Application No. 316/KOLNP/2013.
International Preliminary Report on Patentability dated Jul. 12, 2018 in connection with International Application No. PCT/CA2016/051555.
International Preliminary Report on Patentability dated Aug. 23, 2018 in connection with PCT/CA2017/050172.
International Search Report and Written Opinion dated Nov. 16, 2018 in connection with PCT/CA2018/051058.
"Changing the Story of Waste Plastic (Crowdcube presentation)", Feb. 2018, Retrieved from the Internet: https://hikstartupresources.com/wp-content/uploads/2018/02/recycling-technologies-ltd-business-plan.pdf [retrieved on Aug. 22, 2019].
Yu, Peroxide modified polyolefin blends Part 1: Effects on LDPE/PP blends with components with similar initial viscosities, Adv. Polymer Tech., 10(3), (1990), pp. 163-172.
Lai et al., Development of heterogeneous catalyst by ionically bonding macrocyclic Zr—Zr complex to montmorillonite clay for depolymerization of polypropylene, Journal of Molecular Applied Catalysis A: Chemical, Apr. 16, 2007, pp. 15-24, vol. 265, Issues 1-2.
European Search Report dated Apr. 4, 2011 in connection with European Patent Application No. 10172039.
Extended European Search Report dated Apr. 15, 2011 in connection with European Patent Application No. 10172039.9-2104.
International Search Report and Written Opinion dated Jan. 5, 2012 in connection with International Patent Application No. PCTIB2011001642.
International Preliminary Report on Patentability dated Aug. 1, 2012, in connection with International Application No. PCTIB2011001642.
International Search Report and Written Opinion dated Sep. 20, 2013 in connection with International Application No. PCTCA2013000041.
Office Action dated Apr. 4, 2014 in connection with Chinese Application No. 201180034887.0.
Office Action dated Jun. 16, 2015 in connection with Japanese Application No. 2013-519172.
International Preliminary Report on Patentability dated Jul. 21, 2015 in connection with International Application PCTCA2013000041.
Office Action dated Oct. 15, 2015 in connection with Malaysian Patent Application No. 2013000128.
Office Action dated Feb. 29, 2016 in connection with Chinese Application No. 201510126290.9.
Office Action dated Oct. 5, 2016 in connection with Canadian Application No. 2805570.
Office Action dated Oct. 6, 2016 in connection with Canadian Application No. 2898257.
International Search Report and Written Opinion dated Mar. 17, 2017 in connection with International PCTCA2016051555.
Office Action dated Nov. 30, 2017 in connection with Indian Application No. 316/KOLNP/2013.
Garcia et al., Recycling extruded polystyrene by dissolution with suitable solvents, J. of Mat. Cycles and Waste Management, 2009, vol. 11(1), pp. 2-5.
Farahanchi et al., Effects of ultrahigh speed twin screw extrusion on the thermal and mechanical degradation of polystyrene, Polymer Engineering, 2016, vol. 6(7), pp. 743-751.
International Preliminary Report on Patentability dated Apr. 11, 2019 in connection with International Application No. PCT/CA2017/051166.
Examination Report No. 1 dated May 1, 2019 in connection with Australian application No. 2018204945.
Extended European Search Report dated Oct. 7, 2019 in connection with European Patent Application No. 17749885.4.

* cited by examiner

| Time | Control Formulation 1 | Wax Blend Formulation 1 | Wax Blend Formulation 2 |
|---|---|---|---|
| 2 Hours | | | |
| 3 Hours | | | |
| 4 Hours | | | |
| 5 Hours | | | |
| 6 Hours | | | |
| 7 Hours | | | |
| 8 Hours | | ~~~~ | ~~~~ |
| 9 Hours | | ~~~~ | ~~~~ |
| 10.5 Hours | | ~~~~ | ~~~~ |

FIG. 8

| Time | Control Formulation 1 | Wax Blend Formulation 3 (pre-polymer addition) | Wax Blend Formulation 3 (post-polymer addition) |
|---|---|---|---|
| 2 Hours | | | |
| 3 Hours | | | |
| 4 Hours | | | |
| 5 Hours | | | |
| 6 Hours | | | |
| 7 Hours | | | |
| 8 Hours | | | |
| 9 Hours | | --- | |
| 10.5 Hours | | | |

FIG. 11

US 10,597,507 B2

POLYMER-MODIFIED ASPHALT WITH WAX ADDITIVE

CROSS-REFERENCE TO RELATED APPLICATIONS

This application is a continuation of and claims priority benefit from International Application No. PCT/CA2017/050172 filed on Feb. 13, 2017, entitled "Polymer-Modified Asphalt With Wax Additive" which, in turn, claims priority benefit from U.S. Application Ser. No. 62/295,035 filed on Feb. 13, 2016, also entitled "Polymer-Modified Asphalt With Wax Additive". The '172 and '035 applications are hereby incorporated by reference herein in their entireties.

FIELD OF THE INVENTION

The present invention relates to a method of creating synthetic waxes from recycled plastic material, and employing the waxes as additives in asphalt processing and modification.

BACKGROUND OF THE INVENTION

Additives in asphalt processing and modifications are commonplace. However, use of wax to improve the physical properties and processability of roofing asphalt, also known as flux, has not been employed to any significant extent.

In the recent past, there have been considerable efforts to convert polymeric solid wastes into useful products. Existing conversion processes are not efficient and can release green-house gases into the environment.

A low cost method of producing wax that can be employed to achieve improved processing and more desirable physical characteristics of polymer modified asphalt, while ensuring good blending of the asphalt and polymer additive, would be commercially advantageous. Such a method would ideally employ a readily available, inexpensive feedstock, preferably recyclable material, and employ an economical process.

SUMMARY OF THE INVENTION

Shortcomings of conventional methods of producing additive-modified asphalt are overcome by a method for forming a wax and employing the wax to modify asphalt. The process comprises:
(a) selecting a solid polymeric material;
(b) heating the solid polymeric material in an extruder to produce a molten polymeric material;
(c) filtering the molten polymeric material;
(d) placing the molten polymeric material through a chemical depolymerization process in a reactor to produce a depolymerized wax material;
(e) adding the depolymerized wax material to a pre-wax mixture to produce a polymer-modified asphalt.

The present method can be continuous or semi-continuous.

In the present method, the polymeric material can be one or more of high-density polyethylene, low density polyethylene, linear low-density polyethylene, and polypropylene. The polymeric material can contain recycled plastics.

In a preferred method, the polymeric material and the pre-wax asphalt blend contain recycled plastics.

The present method can further comprise:
(f) filtering the solid polymeric material.
The present method can further comprise:
(f) cooling the depolymerized polymeric material.
The present method can still further comprise:
(g) purifying the depolymerized polymeric material.

The purifying step can employ one of flash separation, absorbent beds, clay polishing and film evaporators.

In the present method, the depolymerized material is preferably added to the pre-wax asphalt blend mixture via an in-line pump. The pre-wax mixture can comprise the solid polymeric material and atactic polypropylene.

The present method can further comprise:
(f) employing gas and oil produced during purification of the depolymerized polymeric material as fuel for at least one step of the method.

The filtering can employ one of a screen changer and a filter bed.

In a preferred method, the depolymerization process preferably employs a catalyst. The preferred catalyst employs a zeolite or alumina support.

In a preferred method, the depolymerization process employs a second reactor. The reactors can be connected in series and can be stacked vertically. One or more of the reactors can include a static mixer.

BRIEF DESCRIPTION OF THE DRAWINGS

FIG. 8 is a table of micrographs showing polymer fluorescence under ultraviolet (UV) light exposure for Control Formulation, Wax Blend Formulation 1, and Wax Blend Formulation 2.

FIG. 11 is a table of micrographs showing polymer fluorescence under ultraviolet (UV) light exposure for Control Formulation, Wax Blend Formulation 3 (pre-polymer addition), and Wax Blend Formulation 3 (post-polymer addition).

DETAILED DESCRIPTION OF ILLUSTRATIVE EMBODIMENT(S)

A process of converting polymeric material, such as waste polymeric material, into wax is described below. The wax can then be employed to modify asphalt. Waxes are compatible with a wide variety of asphalt additives, and can be combined with a variety of materials commonly employed to improve the quality of asphalts.

In some embodiments, the addition of the wax improves the processing and physical characteristics of the polymer modified asphalt, including:
  reduction in blend time to achieve optimal or near-optimal dispersion of the polymer, resulting in higher throughputs;
  enablement of higher recycled asphalt (RAP) and recycled asphalt shingle (RAS) loading through reduced mix stiffness and increased lubricity; and
  compaction and material handling.

In other or the same embodiments, the addition of wax improves the physical characteristics of the final asphalt product. The resulting final products can have various properties that differ from their unmodified forms. In some embodiments, the properties include, among other things, improved force ductility; increased softening point; thermal stability; improved polymer dispersion and viscosity. Improvements to elastomeric properties and energy of deformation are also observed in some embodiments.

The present method involves two main concepts: (1) the creation of the synthetic wax via depolymerization of plastics, and then (2) adding this wax to polymer modified asphalt. In some embodiments, the plastic stock employed to produce the synthetic wax is the same stock employed to produce the polymer modified asphalt.

Figure 1:
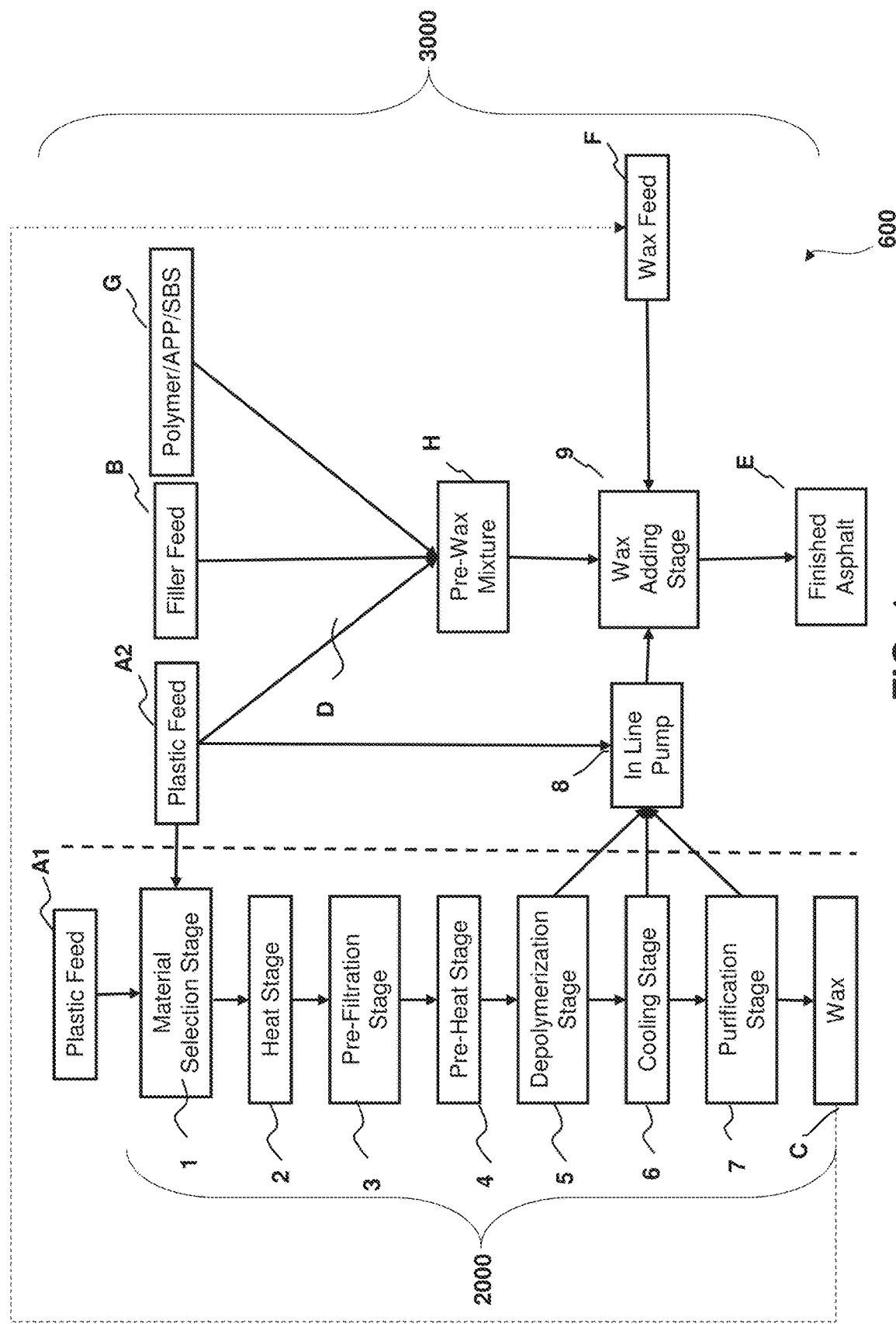
FIG. 1 is a flowchart illustrating a process for creating a wax and employing it as an additive in asphalt modification.

FIG. 1 illustrates process 600 for creating synthetic waxes and then using those waxes to produce polymer modified asphalt. Process 600 can be run in batches, but more preferably is a continuous process. The parameters of Process 600, including but not limited to temperature, flow rate of plastic and total number of pre-heat, reaction, or cooling segments, can be modified to produce end products of varying molecular weights and structural properties. For example raising the temperature and/or decreasing the flow rate through Wax Creation Stage 2000 will result in waxes of a lower molecular weight. Wax Creation Stage 2000 allows for precise targeting of specific wax characteristics, such as those that maximize the desire effect of blending.

In Material Selection Stage 1, polymeric feed is selected and/or prepared for treatment. In some embodiments, the polymeric feed in sorted/selected to include polyethylene material. The polymer can be HDPE, LDPE, LLDPE, or other variations of polyethylene.

In other embodiments, the polymeric feed in sorted/selected to include polypropylene material. In other embodiments, the polymeric feed in sorted/selected to include both polyethylene and polypropylene material. In some embodiments, the feed can contain up to 20% polypropylene, lower levels of polystyrene, PET, EVA, PVC, EVOH, and undesirable additives and/or contaminants, such as fillers, dyes, metals, various organic and inorganic additives, moisture, food waste, dirt, or other contaminating particles.

In some embodiments, the material selected in Material Selection Stage 1 comprises recycled plastics. In other or the same embodiments, the material selected in Material Selection Stage 1 comprises recycled plastics and/or virgin plastics.

The polymeric feed for Material Selection Stage 1 can come from either Plastic Feed A1 or Plastic Feed A2. When the feed comes from Plastic Feed A2, the resulting wax will have a similar composition when it is added with more plastic from Plastic Feed A2 to produce Finished Asphalt E. This leads to a more homogenous product with improved high temperature thermal and structural properties.

In some embodiments, the material selected in Material Selection Stage 1 is heated in an extruder and undergoes Pre-Filtration Process 3. In some embodiments the extruder is employed to increase the temperature and/or pressure of the incoming plastic and is employed to control the flow rates of the plastic. In some embodiments, the extruder is complimented by or replaced entirely by pump/heater exchanger combination.

Pre-Filtration Process 3 can utilize both screen changers and filter beds, along with other filtering techniques/devices to remove contaminants from and purify the heated material. The resulting filtered material is then moved into an optional Pre-Heat Stage 4 which brings the filtered material to a higher temperature before it enters Depolymerization Stage 5. Pre-Heat Stage 4 can employ, among other devices and techniques, static and/or dynamic mixers and heat exchangers such as internal fins and heat pipes.

Material in Depolymerization Stage 5 undergoes depolymerization. This depolymerization can be a purely thermal reaction or it can employ catalysts. Depending on the starting material and the desired end product, depolymerization could be employed for a slight or extreme reduction of the molecular weight of the starting material.

In some embodiments, the catalyst employed is a zeolite or alumina supported system or a combination of the two. In some embodiments, the zeolite contains aluminum oxide. In some embodiments, the catalyst is prepared by binding a ferrous-copper complex to an alumina or zeolite support and reacting it with an inorganic acid.

Depolymerization Stage 5 can employ a variety of techniques/devices including, among other things, horizontal and/or vertical reactors fixed bed or batch reactors, and/or static mixers. In some embodiments, Reaction Stage 5 employs multiple reactors and/or reactors divided into multiple sections to produce a semi-continuous or continuous process.

After Depolymerization Stage 5, the depolymerized material either enters Cooling Stage 6 or is pumped via In-line Pump 8 and mixed with Pre-Wax Mixture H during Wax Adding Stage 9 to produce Finished Asphalt E.

Cooling Stage 6 can employ heat exchangers, along with other techniques/devices to bring the depolymerized material down to a workable temperature before it enters optional Purification Stage 7 or is pumped via In-line Pump 8 and mixed with Pre-Wax Mixture H during Wax Adding Stage 9 to produce Finished Asphalt E.

In some embodiments, cleaning/purification of the material via such methods such as nitrogen stripping occurs before Cooling Stage 6.

Purification Stage 7 involves the refinement and/or decontamination of the depolymerized material. Techniques/devices that can be employed in Purification Stage 7 include, but are not limited to, flash separation, absorbent beds, clay polishing, distillation, vacuum distillation and filtration to remove solvents, oils, color bodies, ash, inorganics, and coke. In some embodiments a thin or wiped film evaporator is employed to remove gas, oil, and/or grease from the depolymerized material. In some embodiments the oil, gas and grease can in turn be burned to help run various Stages of Process 10.

In some embodiments a wiped film evaporator is used to remove gas, oil, and/or grease from the depolymerized material. In some embodiments, the oil, gas and grease can in turn be burned to help run various Stages of Process 2000. In some embodiments, the purified material is pumped via In-line Pump 8 and mixed with Pre-Wax Mixture H during Wax Adding Stage 9 to produce Finished Asphalt E. In other embodiments, the purified material is processed as a solid Finished Wax C that can then be employed as Wax Feed F in Asphalt Modification Stage 3000.

Wax Creation Stage 2000 ends at Wax C in which the initial starting material selected in Material Selection Stage 1 has been turned into Wax C. In at least some embodiments, Wax C is included as part of Wax Feed F. In some embodiments, Wax C is not highly branched and instead has a more linear structure.

Asphalt Modification Stage 3000 involves combining plastic from Plastic Feed A2 with a synthetic wax. In some embodiments, Plastic Feed A2, Filler Feed B and Polymer Feed G, which preferably comprises atactic polypropylene (APP) and/or styrene-butadiene-styrene (SBS), are mixed together to form Pre-Wax Mixture H. A synthetic wax is then added, either via In-line Pump 8 or Wax Feed F in Wax Adding Stage 9 before Finished Asphalt E is produced. In some embodiments, the synthetic wax can be added to Pre-Wax Mixture H; however tests have found improved properties when the wax is added afterwards.

When the synthetic wax is added via In-line Pump 8, some steps in the process can be eliminated, such as cooling the wax (Cooling Stage 6), purifying the wax (Purification Stage 7) and/or transporting the wax from one location to another.

In some embodiments, the wax in Wax Feed F was produced via Wax Creation Stage 2000.

In some embodiments, the percentage of wax in the wax/asphalt compound is roughly 0.1 to 25 percent by weight. The above method can employ a variety of waxes, including those with melt points between 60-160° Celsius, and viscosities 5-3000 cps, preferable in the range 110-130° C., and 100-2000 cps.

Changes in melting point and viscosity of the wax can change the properties of the asphalt mixture.

Figure 2:
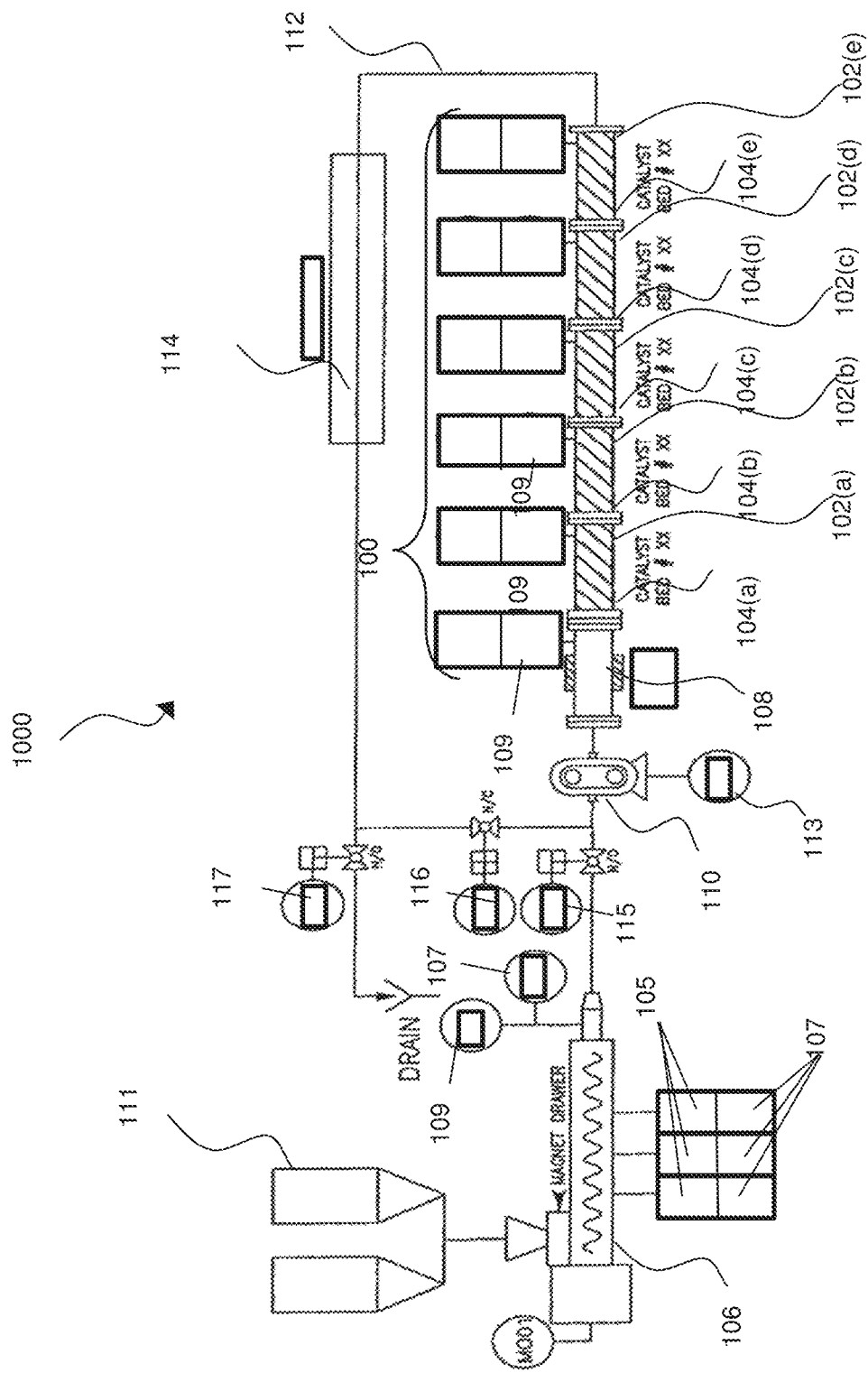
FIG. 2 is a schematic diagram of a system for producing wax from plastic feedstocks.

Referring to FIG. 2, System 1000 includes reactor 700 with five reactor modules 102($a$) through 102($e$). Reactor modules 102 can vary in dimensions and/or be connected in parallel and/or series. In other embodiments, various numbers of reactor modules 102 can be employed. The ability to customize the number of reactor modules 102 allows for greater control of the amount of depolymerization. System 1000 is often used in Wax Creation Stage 2000.

System 1000 can include hopper 111 for receiving polymeric material and/or directing the supply of the polymeric material to optional extruder 106. In some embodiments, extruder 106 processes the polymeric material received from hopper 111 by generating a molten polymeric material. The temperature of the polymeric material being processed by extruder 106 is controlled by modulating the level of shear and/or the heat being applied to the polymeric material by extruder heater(s) 105. Extruder heaters can use a variety of heat sources including, but not limited to, electric, thermal fluids, and/or combustion gases. The heat is modulated by a controller, in response to temperatures sensed by temperature sensor(s) 107.

In some embodiments, pressure sensor 109 measures the pressure of the molten polymeric material being discharged from extruder 106, to prevent, or at least reduce, risk of pressure spikes. The discharged molten polymeric material is pressurized by pump 110 to facilitate its flow through heating zone 108 and reactor 100. While flowing through reactor 100, the reactor-disposed molten polymeric material contacts a catalyst material which causes depolymerization.

Pressure sensor(s) 109 and/or temperature sensor(s) 107 can also be employed to measure temperature and/or pressure, respectively, of the reactor-disposed molten polymeric material as it flows through reactor 100. Pressure sensor(s) 109 can monitor for plugs before and/or after each reaction zones. Pressure sensor(s) 109 can also maintain system pressure below a maximum pressure such as the maximum pressure of reactor 700 is designed for. Over-pressure can be controlled by feedback from pressure transmitter 109 to a controller which transmits a command signal to shut down extruder 106 and pump 110, and thereby prevent the pressure from further increasing.

In cases when shutdown of extruder 106 does not relieve the over pressure, dump valve 117 can be opened into a container to remove material from system 1000 and avoid an over pressure situation. During shutdown dump valve 117 can be opened to purge system 1000 with nitrogen to remove leftover material to avoid clogs and degraded material during the next start up.

System 1000 can also include a pressure relief device, such as a relief valve or a rupture disk, disposed at the outlet of extruder 106, to relieve pressure from system 1000, in case of over-pressure.

Temperature sensor(s) 107 can facilitate control of the temperature of the reactor-disposed molten polymeric material being flowed through reactor 100. This allows more precise control of the chemical reaction and the resulting polymerization. Temperature sensor(s) 107 also aid in maintaining the temperature below a predetermined maximum temperature, for example the maximum design temperature of reactor 100.

The temperature is controlled by a controller (not shown), which modulates the heat being applied by heaters 118 disposed in heat transfer communication with the reaction zones 102($a$) through 102($e$) of reactor 100, in response to the temperatures sensed by temperature sensor(s) 119.

System 1000 can also include a pressure relief device, such as a relief valve or a rupture disk, disposed at the outlet of extruder 106, to relieve pressure from system 10, in case of over-pressure.

Flow control can also be provided for within system 1000. In some embodiments, system 1000 includes valve 115, disposed at the discharge of extruder 106, for controlling flow from extruder 106 to other unit operations within system 1000. Valve 116 facilitates recirculation. Valve 117 enables collection of product.

During operation, valve 115 can be closed in order to recirculate the molten polymeric material and increase the temperature of the molten polymeric material to a desired temperature. In this case valve 116 would be open, valve 117 would be closed, extruder 106 would be "OFF", and pump 110 would be recirculating.

Generated molten product material 112 is cooled within heat exchanger 114, which can be, among other ways, water jacketed, air cooled, and/or cooled by a refrigerant. A fraction of the cooled generated molten product material can be recirculated (in which case valve 116 would be open), for reprocessing and/or for energy conservation.

In some embodiments, system 1000 is configured for purging by nitrogen to mitigate oxidation of the molten product.

In System 1000 reactor 700 includes one or more reactor modules. Each reactor modules includes a respective module reaction zone in which the reactor-disposed molten polymeric material is brought into contact with a catalyst material over a module-defined residence time, thereby causing depolymerization of the flowing reactor-disposed molten polymeric material. In some of these embodiments, the module-defined residence time of at least two of the reactor modules is the same or substantially the same. In some of these embodiments, as between at least some of the plurality of module-defined residence times are different. In some embodiments, the catalyst material of at least two of the reactor modules is the same or substantially the same. In other embodiments, the catalyst material of at least two of the reactor modules is different.

In some embodiments, each of the reactor modules includes a reactor-disposed molten polymeric material-permeable container that contains the catalyst material. The container is configured to receive molten polymeric material such that at least partial depolymerization of at least a fraction of the received molten polymeric material is effected by the catalyst material, and to discharge a molten product material that includes depolymerization reaction products (and can also include unreacted molten polymeric material and intermediate reaction products, or both). Flowing of the reactor-disposed molten polymeric material through the reactor-disposed molten polymeric material-permeable container effects contacting between the catalyst material and the reactor-disposed molten polymeric material, for effecting the at least partial depolymerization of at least a fraction of the reactor-disposed molten polymeric material. In this respect, the flowing reactor-disposed molten polymeric material permeates through the catalyst material within the container, and while permeating through the catalyst material, contacts the catalyst material contained within the container, for effecting the at least partial depolymerization of at least a fraction of the reactor-disposed molten polymeric material.

In System 1000 a first reactor is assembled from the reactor modules. The first reactor has a first reaction zone and includes a total number of "P" reactor modules from "N" reactor modules, wherein "N" is a whole number that is greater than or equal to one.

Each one of the "N" reactor modules defines a respective module reaction zone including a catalyst material disposed therein, and is configured for conducting a flow of reactor-disposed molten polymeric material through the respective module reaction zone, such that, flowing of the reactor-disposed molten polymeric material through the respective module reaction zone brings it into contract with the catalyst material, thereby causing at least partial depolymerization of at least a fraction of the flowing reactor-disposed molten polymeric material. In this respect, the first reaction zone includes "P" module reaction zones.

When "N" is a whole number that is greater than or equal to two, each one of the "N" reactor modules is configured for connection, in series, to one or more of the other "N" reactor modules such that a plurality of reactor modules are connected to one another, in series, and includes a plurality of module reaction zones that are disposed in fluid communication within one another, in series, such that the total number of module reaction zones correspond to the total number of connected reactor modules. The plurality of connected reactor modules is configured for conducting a flow of reactor-disposed molten polymeric material through the plurality of module reaction zones, such that it comes into contact with the catalyst material, thereby effecting at least partial depolymerization of at least a fraction of the flowing reactor-disposed molten polymeric material.

When "P" is a whole number that is greater than or equal to two, the assembling of the first reactor includes connecting the "P" reactor modules to one another, in series, such that "P" reaction zones are disposed in fluid communication with one another in series.

In the embodiment illustrated in FIG. 2, "P" is equal to five, such that reactor 700 includes five reactor modules 102(a) through 102(e), the reaction zone consisting of five module reaction zones 104(a) through 104(e), each one respective to a one of the five reactor modules. "P" can be more or less than five.

Molten polymeric material, for supplying to the constructed reactor, is generated by heating a polymeric material. In some embodiments, the heating is caused by a heater. In FIG. 2 the heating is produced by a combination of extruder 106 and separate heater 108. In such embodiments, the generated molten polymeric material is forced from the extruder, flowed through a separate heater, and then supplied to the module reaction zone. In some embodiments, the extruders are configured to supply sufficient heat to the polymeric material such that the generated molten polymeric material is at a sufficiently high temperature for supply to the reactor, and a separate heater is not required.

In FIG. 2, pump 110 receives molten polymeric material from extruder 106 and effects transport (or flowing) of the molten polymeric material through heater 108, and then through the first reaction zone. In some embodiments, extruder 106 is configured to impart sufficient force to effect the desired flow of the generated molten polymeric material, such that pump 110 is optional.

In some embodiments, the molten polymeric material is derived from a polymeric material feed that is heated to effected generation of the molten polymeric material. In some embodiments, the polymeric material feed includes primary virgin granules of polyethylene. The virgin granules can include low density polyethylene (LDPE), linear low density polyethylene (LLDPE), high density polyethylene (HDPE), polypropylene (PP), or a mixture including combinations of LDPE, LLDPE, HDPE, and PP.

In some embodiments, the polymeric material feed includes waste polymeric material feed. Suitable waste polymeric material feeds include mixed polyethylene waste, mixed polypropylene waste, and a mixture including mixed polyethylene waste and mixed polypropylene waste. The mixed polyethylene waste can include low density polyethylene (LDPE), linear low density polyethylene (LLDPE), high density polyethylene (HDPE), polypropylene (PP), or a mixture including combinations of LDPE, LLDPE, HDPE and PP. In some embodiments, the mixed polyethylene waste can include film bags, milk jugs or pouches, totes, pails, caps, agricultural film, and packaging material. In some embodiments, the waste polymeric material feed includes up to 10 weight % of material that is other than polymeric material, based on the total weight of the waste polymeric material feed.

The molten polymeric material is supplied to the reactor, and the molten polymeric material is flowed through the first reaction zone (i.e. including the "P" reaction zones) as reactor-disposed molten polymeric material. The flowing of the reactor-disposed molten polymeric material through the first reaction zone brings it into contact with the catalyst material generating a molten product material, including a depolymerization product material (and, in some embodiments, also includes unreacted molten polymeric material and/or intermediate reaction products). The molten product material is then collected.

In some embodiments, the catalyst is prepared by binding a ferrous-copper complex to an alumina support and reacting it with an inorganic acid to obtain the catalyst material. Other suitable catalyst materials include zeolite, mesoporous silica, alumina and H-mordenite. The system can also be run in the absence of a catalyst and produce waxes through thermal degradation.

The generated molten product material is discharged from and collected/recovered from the reactor. In some embodiments, the collection of the molten product material is effected by discharging a flow of the molten product material from the reactor. In those embodiments, with a plurality of reactor modules, the molten product material is discharged from the first reactor module and supplied to the next reactor module in the series for effecting further depolymerization within the next reactor module in the series, and this continues as-between each adjacent pair of reactor modules in the series.

In some embodiments, the generated depolymerization product material includes waxes, greases, oils, fuels, and C1-C4 gases, and grease-base stocks. Commercially available greases are generally made by mixing grease base stocks with small amounts of specific additives to provide them with desired physical properties. Generally, greases include four types: (a) a mixture of mineral oils and solid lubricants; (b) blends of residuum (residual material that remains after the distillation of petroleum hydrocarbons), uncombined fats, rosin oils, and pitches; (c) soap thickened mineral oils; and (d) synthetic greases, such as poly-alpha olefins and silicones.

In some embodiments, the polymeric feed material is one of, or a combination of, virgin polyethylene (any one of, or combinations of, HDPE, LDPE, LLDPE and medium-density polyethylene (MDPE)), virgin polypropylene, or post-consumer, or post-industrial, polyethylene or polypropylene (exemplary sources including bags, jugs, bottles, pails, and/or other items containing PE or PP), and it is desirable to convert such polymeric feed material into a higher melting point wax (having a melting point from 106° C. to 135° C.), a medium melting point wax (having melting point from 86° C. to 105° C.), and a lower melting point wax (having a melting point from 65° C. to 85° C.), an even lower melting point wax (having a melting point from 40° C. to 65° C.), using an embodiment of the system disclosed herein.

In each case, the conversion is effected by heating the polymeric feed material so as to generate molten polymeric material, and then contacting the molten polymeric material with the catalyst material within a reaction zone disposed at a temperature of between 325° C. and 450° C. The quality of wax (higher, medium, or lower melting point wax) that is generated depends on the residence time of the molten polymeric material within the reaction zone. When operating in a continuous system depending on the flowrate of the extruder or gear pump residence times vary from 1-120 minutes, preferably 5-60 minutes, with 1-12 reactor modules attached in series. In some of these embodiments, the supply and heating of the polymeric feed material is effected by a combination of an extruder and a pump, wherein the material discharged from the extruder is supplied to the pump. In some of these embodiments, extruder 106 is a 10 HP, 1.5 inch (3.81 cm) Cincinnati Milacron Pedestal Extruder, Model Apex 1.5, and the pump 110 is sized at 1.5 HP for a 1.5 inch (3.81 cm) line.

A pressure transducer PT01 monitors for plugs within the extruder (as well as prior to PT02, see below) for maintaining system pressure below a maximum pressure (namely, the maximum design pressure of the reactor 100). Likewise, pressure transducer PT02 monitors for plugs elsewhere within the system. Over-pressure is controlled by feedback from the pressure transmitted by PT01 and PT02 to a controller which transmits a command signal to shut down the extruder 106 and the pump 110, and thereby prevent the pressure from further increasing.

In some embodiments, reactor 100 is first reactor 100, and the reaction zone of the first reactor is a first reaction zone, and the flowing of the molten polymeric material, through the first reaction zone, is suspended (such as, for example, discontinued).

When "P" is equal to one, the modifying includes connecting a total number of "R" of the "N−1" reactor modules, which have not been used in the assembly of the first reactor, to the first reactor, in which "R" is a whole number from 1 to "N−1", such that another reactor is added and includes a total number of "R+1" reactor modules that are connected to one another, in series, and such that the another reactor includes a second reaction zone including "R+1" module reaction zones. Then another reactor is configured to conduct a flow of molten polymeric material, such that flowing of the reactor-disposed molten polymeric material through the second reaction zone effects generation of another depolymerization product material and its discharge from the another reactor.

When "P" is a whole number that is greater than or equal to two, but less than or equal to "N−1", the modifying includes either one of:

(a) removing a total number of "Q" of the "P" reactor modules from the first reactor, wherein "Q" is a whole number from one to "P−1", such that another reactor is added and includes a total number of "P-Q" reactor modules that are connected to one another, in series, and such that the another reactor includes a second reaction zone including "P-Q" module reaction zones, wherein the another reactor is configured to conduct a flow of molten polymeric material, such that flowing of the reactor-disposed molten polymeric material through the second reaction zone effects of generation of another depolymerization product material and its discharge from the another reactor, or (b) connecting a total number of "R" of the "N−P" reactor modules, which have not been employed in the assembly of the first reactor, to the first reactor, wherein "R" is a whole number from 1 to "N−P", such that another reactor is added and includes a total number of "P+R" reactor modules that are connected to one another, in series, and also includes a second reaction zone including "P+R" module reaction zones, wherein the another reactor is configured to conduct a flow of molten polymeric material, such that flowing of the reactor-disposed molten polymeric material through the second reaction zone effects generation of another depolymerization product material and its discharge from the another reactor;

When "P" is equal to "N", the modifying includes removing a total number of "Q" of the "P" reactor modules from the first reactor, wherein "Q" is a whole number from one to "P−1", such that another reactor is added and includes a total number of "P−Q" reactor modules that are connected to one another, in series, and such that the another reactor includes a second reaction zone, including "P−Q" module reaction zones. The another reactor is configured to conduct a flow of molten polymeric material, such that flowing of the reactor-disposed molten polymeric material through the second reaction zone effects generation of another depolymerization product material and its discharge from the another reactor.

In some embodiments, after the modifying of the first reactor to effect creation of another reactor (by either one of connecting/adding or removing reactor modules), another reactor is employed to generate a second depolymerization product material. In this respect, polymeric material is heated to generate a molten polymeric material, and the molten polymeric material is flowed through the second reaction zone, to effect generation of a second depolymerization product material. The second depolymerization product material is then collected from the reactor.

In some embodiments, the same catalyst material is disposed within each one of the "N" reactor modules.

In some embodiments, the reaction zone of each one of the "N" reactor modules is the same or substantially the same.

Figure 3:
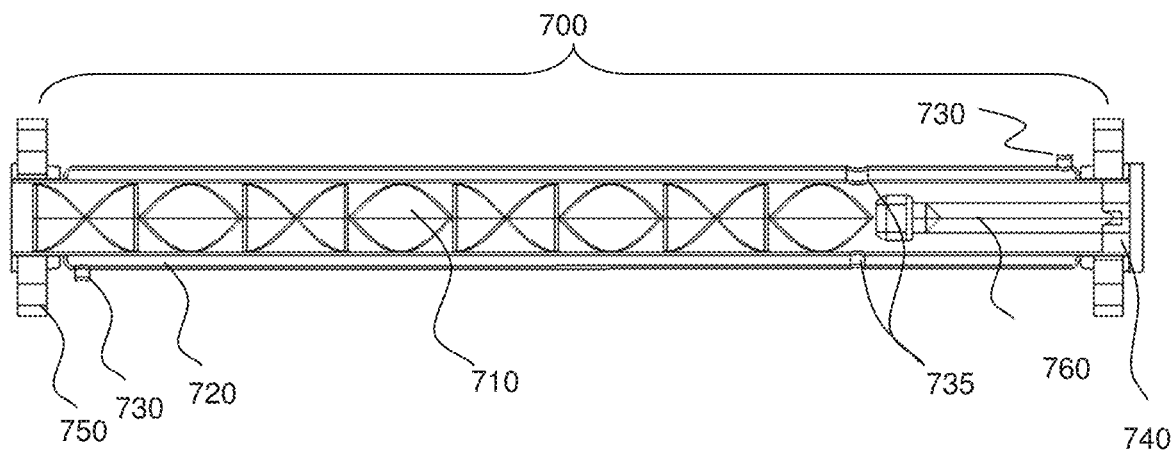
FIG. 3 is a cross-sectional side elevation view of a catalytic reactor with a removable static mixer configured to be heated via thermal fluid/molten salt.

FIG. 3 shows a cross-section side-elevation view of catalytic reactor 700 with removable static mixer 710 configured to be heated via thermal fluid and/or molten salt. Static mixer 710 provides greater mixing in catalytic reactor 700 and can result in the need of a lower operating temperature. In other embodiments, catalytic reactor 700 can include an annular insert. In other embodiments, catalytic reactor 700 can have empty internals. In certain embodiments, catalytic reactor 700 employs electric heating.

The tubular configuration of catalytic reactor 700 offers several advantages in addition to those already mentioned above. In particular, use of tubular reactors connected in series allows for dependable and consistent parameters, which allows for a consistent product. Specifically, a consistent flow through the tubular sections produces a more predictable and narrow range of end products than would be produced using a continuous stirred reactor, as the surface area of the catalyst and heat input is maximized. One advantage over continuous stirred reactors is elimination of shortcutting, flow in tubular section hypothetically moves as a plug. Each hypothetical plug spends the same amount of time in the reactor. Tubular catalytic reactors can be operated vertically, horizontally, or at any angle in between. Tubular catalytic reactors (the reactor sections) and the corresponding pre-heat sections and cooling sections can be a universal size or one of several standard sizes. This allows not only for a consistent flow of the material, but also allows for tubular elements to be designed to be interchangeable among the various section and easily added, removed, cleaned, and repaired. In at least some embodiments, the inner face of the tubular sections are made of 304 or 316 steel.

The thermal fluid and/or molten salt can enter jacket 720 via inlet/outlets 730. In some embodiments, catalytic reactor 700a is configured to be mounted with a thermocouple/pressure transducer (not shown) and includes relevant notches 735. Notches 735 are used to bring the thermocouple/pressure transducer in physical contact with the fluid. In some embodiments the thermocouple/pressure transducer will be mounted in a well, which reduces the material in-between the fluid and the sensor.

In some embodiments, catalytic reactor 700 includes removable screen 760 that can hold the catalyst. Removable screen 760 can be easily replaced overcoming disadvantages associated with packed bed reactors, including thermal gradients and challenging maintenance requirements and resulting downtime. In some embodiments, the standardization of removable screen 760 results in a consistent product leaving each section and/or allows for standardization across multiple reactors.

In other or the same embodiments, catalytic reactor 700a can include removable adaptor 740 with cut-outs for static mixer supports. Static mixer supports reduce the force on static mixers 710 allowing for more forceful/rapid removal. The cut-outs of adaptor 740 improve the seal between the adapter and the screens. Catalytic reactor 700a can include flanges 750 on one or both ends to connect catalytic reactor 700a to other reactors, extruders or the like.

Figure 4:
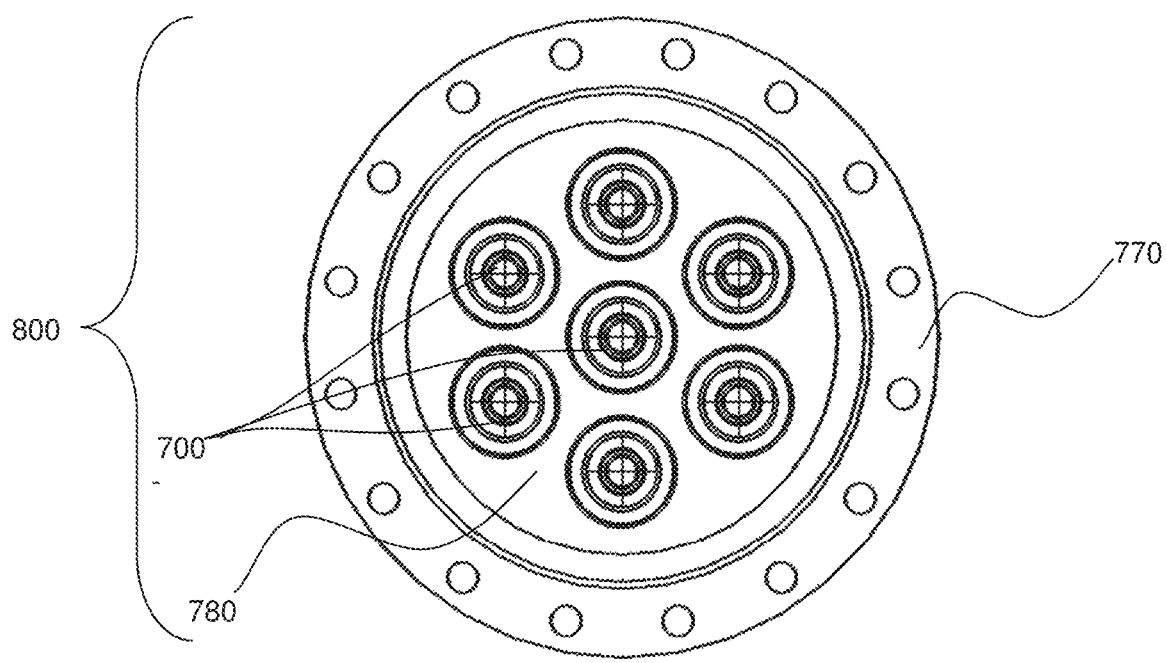
FIG. 4 is a cross-sectional front elevation view of a group of catalytic reactors of the type shown in FIG. 3, arranged in parallel.

FIG. 4 is a cross-section front-elevation view of a group of catalytic reactors 700 like the one shown in FIG. 3 arranged in parallel. Parallel arrangements allow for the total rate of production to be more readily increase/decreased as desired with minimal changes to the overall arrangement and allow multiple different levels of depolymerization to occur at once.

Housing 800 allows catalytic reactors 700 to be bathed in thermal oil-molten salt which is often more effective than electric. The thermal oil-molten salt is contained in chamber 780. In some embodiments, flange 770 allows for multiple housings to be joined together.

Figure 5:
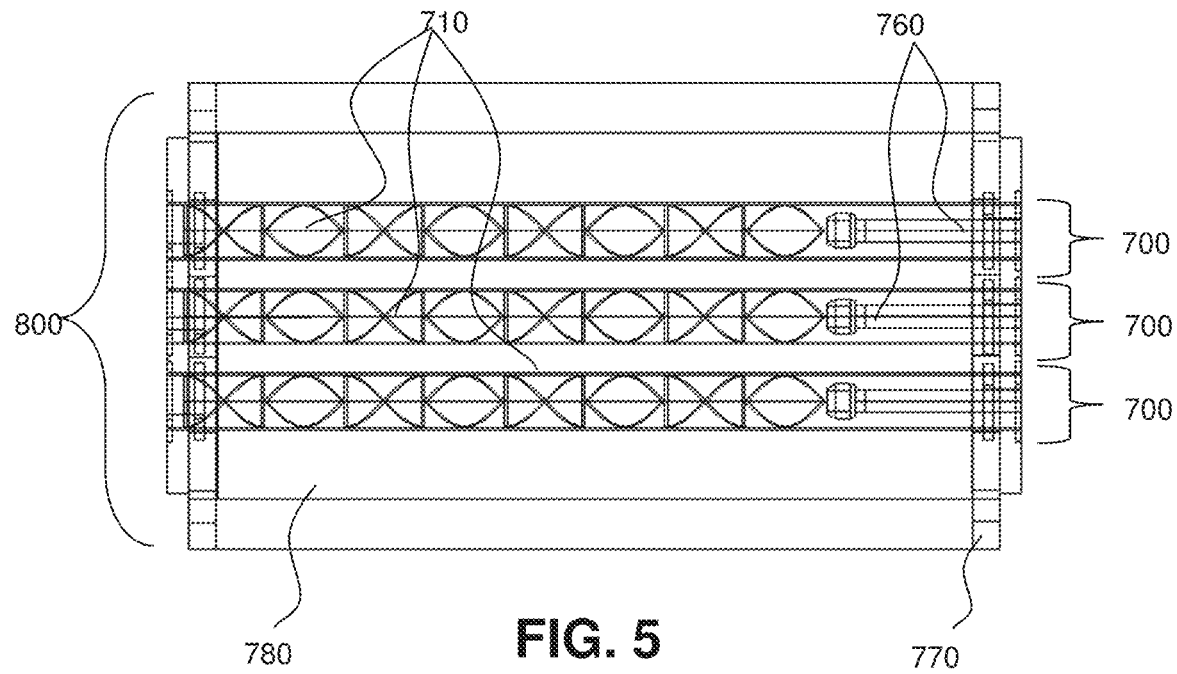
FIG. 5 is a cross-section side elevation view of the parallel catalytic reactor arrangement of FIG. 4, shown in a horizontal configuration.

FIG. 5 is a cross-section side-elevation view of the parallel catalytic reactor arrangement of FIG. 25 show in a horizontal configuration. Parallel arrangement allows for higher flowrate units to be built with smaller pressure drops that could cause issues as compared to a single tube arrangement. Horizontal configurations are often more convenient to operate/maintain. The parallel catalytic reactor arrangement can also be oriented in a vertical configuration.

Figure 6:
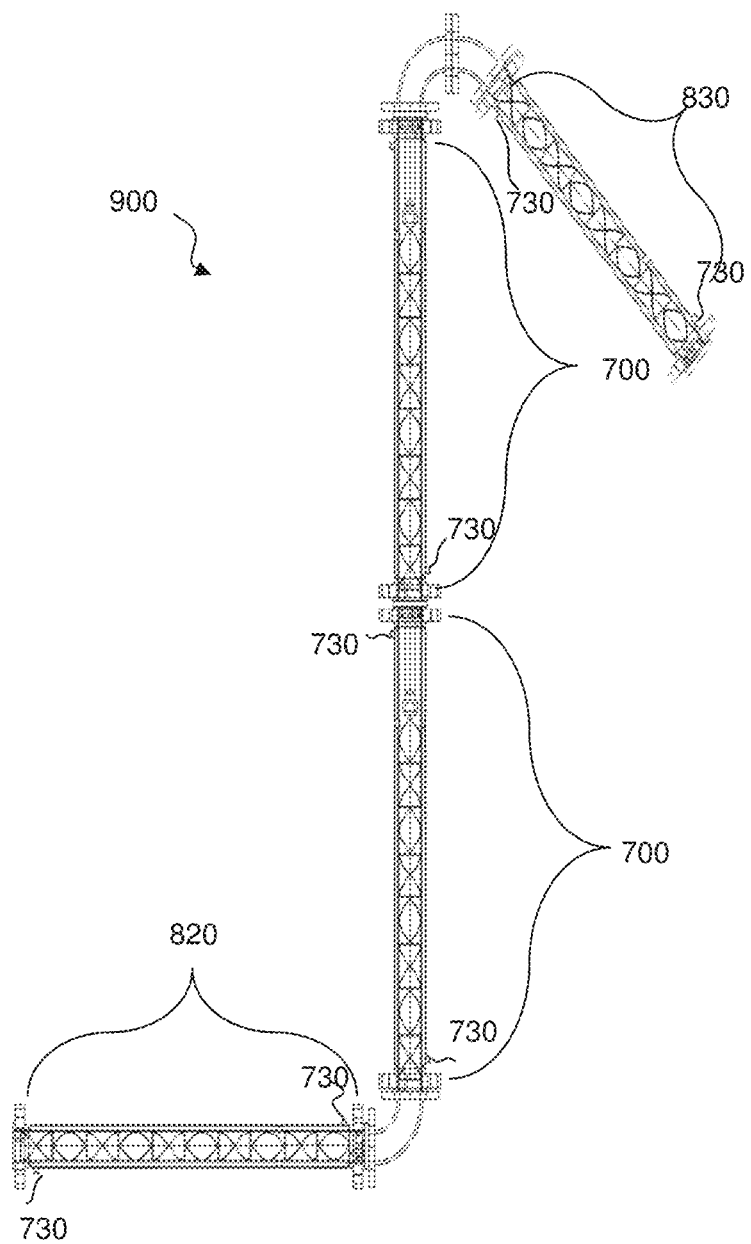
FIG. 6 is a cross-section side elevation view of a vertical helical internal catalytic reactor arrangement with two reactors connected in series.

FIG. 6 is a cross-section side-elevation view of vertical helical internal catalytic reactor arrangement 900 with two reactors 700 like the one shown in FIG. 3 connected in series. Horizontal helical mixer pre-heat section 820 is connected to one reactor 700. Helical mixers can lead to better mixing by avoiding stagnancies and hot spots.

Helical mixer cooling segment 830 is shown connected to the other reactor 700 at a 45° decline. The decline allows for the product to flow via gravity, while the 45 degree angle allows for sufficient contact between the cooling medium and the product.

In the embodiments shown, vertical helical internal catalytic reactor arrangement 900 has several inlet/outlets to allow for the use of thermal fluid/molten salt mixtures however other warming techniques (such as, but not limited to, electric heating) can be employed as well. In other embodiments, annular catalytic reactor and/or reactors with empty internal volumes can be employed. In the same or other embodiments, electric heating can employed to heat reactor 700.

Figure 7:
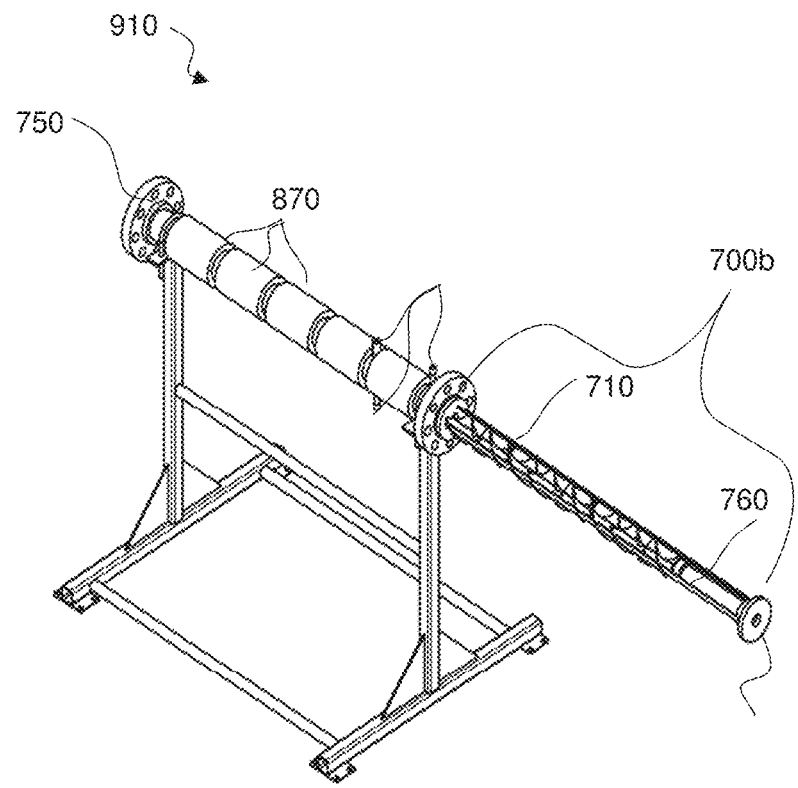
FIG. 7 is a perspective view of a horizontal reactor with an internal helical mixer.

FIG. 7 is a perspective view of horizontal reactor configuration 910 with internal helical reactor 700 configured to employ electric heaters 870 like the one shown in FIG. 3. In FIG. 7 the reactor shell has been removed from part of horizontal reactor configuration 910 to aid in visualizing the location of internal helical reactor 700.

Specific Examples of Plastics Modified by Synthetic Waxes

In an illustrative embodiment of the present process, wax was produced from the depolymerization of post-consumer polyethylene. 3% by weight of the wax (melting point 115°

C.) was mixed with an asphalt composition, the softening point increased from 217° C. (with no wax) to 243° C., the penetration decreased from 15 dmm to 11 dmm.

In another embodiment of the present process, 2% of wax, melting point 115° C. is added to polymer modified bitumen. The addition of wax reduces mixing time from 10.5 hours to 8 hours and the viscosity of asphalt mixture is reduced. Softening point of the mixture is increased, penetration is reduced and elastomeric properties are improved. Dimensional stability at 80° C. is improved, with 5 times reduced deflection in the transverse, 3 times reduced deflection in parallel. Force ductility at 25° C. is improved by 100%.

In another embodiment of the present process, 4% of wax, melting point 125° C. is added to polymer modified bitumen. The addition of wax reduces mixing time from 10.5 hours to 7 hours. Softening point of the mixture is increased, penetration is reduced and elastomeric properties are improved. Dimensional stability is improved, with 5 times reduced deflection in the transverse, 5 times reduced deflection in parallel. Force ductility is improved by 100%. Mixing can be achieved by any method common in asphalt processing. Specific Examples of Plastics Modified by Synthetic Waxes In an illustrative embodiment of the present process is for the addition of 3% of wax, melting point 115° C., resulting from the depolymerization of post-consumer polyethylene. When mixed with an asphalt composition, the softening point increased from 217° C. (with no wax) to 243° C., the penetration decreased from 15 dmm to 11 dmm.

In another embodiment of the present process, 2% of wax, melting point 115° C. is added to polymer modified bitumen. The addition of wax reduces mixing time from 10.5 hours to 8 hours and the viscosity of asphalt mixture is reduced. Softening point of the mixture is increased, penetration is reduced and elastomeric properties are improved. Dimensional stability at 80° C. is improved, with 5 times reduced deflection in the transverse, 3 times reduced deflection in parallel. Force ductility at 25° C. is improved by 100%.

In another embodiment of the present process, 4% of wax, melting point 125° C. is added to polymer modified bitumen. The addition of wax reduces mixing time from 10.5 hours to 7 hours. Softening point of the mixture is increased, penetration is reduced and elastomeric properties are improved. Dimensional stability is improved, with 5 times reduced deflection in the transverse, 5 times reduced deflection in parallel. Force ductility is improved by 100%.

In the mixing of the present polyethylene waxes, the melting point ranging from 45° C. to 135° C., viscosity ranging from 3 to 4000 centipoise (cP) at 140° C. with asphalt. Mixing can be achieved by any method common in asphalt processing.

Effect of Two Different Waxes on Selected Properties of a Modified Bitumen Compound Used for Commercial Roofing As set forth in Table 2 below, Control Formulation consisted of 90% by weight of Base Asphalt (PRI Stock: Mid Continent) and 10% by weight of SBS (Kraton D1101).

Wax Blend Formulation 1 consisted of 86% by weight of Base Asphalt (PRI Stock: Mid Continent), 10% by weight of SBS (Kraton D1101) and 4% by weight of Wax 1 (melting point 115° C.; produced by depolymerization of post-consumer polyethylene).

Wax Blend Formulation 2 consisted of 86% by weight of Base Asphalt (PRI Stock: Mid Continent), 10% by weight of SBS (Kraton D1101) and 4% by weight of Wax 2 (melting point 125° C.; produced by depolymerization of post-consumer polyethylene).

TABLE 1

Sample Data

| Ingredient | Grade/Type | Source |
| --- | --- | --- |
| Asphalt | 150/200 Penetration | PRI Stock: Mid |
| SBS | SBS Linear | Kraton D1101 |
| Limestone | Limestone Filler | Tamko (Shingle) |
| Wax | Wax 1<br>Wax 2 | Applicant |

The preparation of the three blends for testing in this example (unfilled and filled with limestone) was as follows:
(1) The asphalt was heated to 180° C.
(2) 10% by weight SBS was added to the asphalt while high sheared mixing condition was maintained for 30 minutes, followed by 4% wax addition when applicable, then low shear agitation was established for the remaining of the mixing until full dispersion was achieved.
(3) During the maturation phase, aliquot samples were taken for microscopy fluorescence analysis.
(4) For the filled samples, 20% by weight of limestone was added while low shear agitation was maintained during 1 h at 180° C.

TABLE 2

Summary of Blends and Mix Times

| Ingredient | Source | Control Formulation | Wax Blend Formulation 1 | Wax Blend Formulation 2 |
| --- | --- | --- | --- | --- |
| Base Asphalt, wt % | PRI Stock: Mid Continent | 90 | 86 | 86 |
| SBS, wt % | Kraton D1101 | 10 | 10 | 10 |
| Wax, wt % | Wax 1 | 0 | 0 | 4 |
|  | Wax 2 | 0 | 4 | 0 |

| Property | | | Results: | | |
| --- | --- | --- | --- | --- | --- |
|  | Mix Time, hrs | Specification | Control Formulation | Wax Blend Formulation 1 | Wax Blend Formulation 2 |
| Fluorescence Microscopy | 2 | Achieve phase inversion and therefore full dispersion | undispersed | undispersed | undispersed |
|  | 3 |  | undispersed | undispersed | undispersed |
|  | 4 |  | undispersed | undispersed | undispersed |
|  | 5 |  | undispersed | undispersed | undispersed |

TABLE 2-continued

Summary of Blends and Mix Times

| | | | |
|---|---|---|---|
| 6 | undispersed | undispersed | undispersed |
| 7 | undispersed | fully dispersed | Fully dispersed |
| 8 | undispersed | — | — |
| 9 | undispersed | — | — |
| 10 | undispersed | — | — |
| 10.5 | fully dispersed | — | — |

TABLE 3

Filled Modified Bitumen Properties

| | | | Results: | | |
|---|---|---|---|---|---|
| | | | Control Formulation | Wax Blend Formulation 1 | Wax Blend Formulation 2 |
| CTMB (Fail Temperature), ° C. | | D5147M | −23.9 | −23.9 | −23.9 |
| Softening Point, ° C. | | D36 | 93.6 | 105.8 | 102.2 |
| Penetration, dmm | 4° C. | D5 | 41 | 34 | 35 |
| | 25° C. | | 50 | 40 | 39 |
| | 46° C. | | 90 | 60 | 55 |
| Elastic Recovery, % | 4° C. | D6084 B | 76.2 | 56.3 | 63.8 |
| | 10° C. | | 90.0 | 90.0 | 86.25 |
| | 25° C. | | 95.0 | 95.0 | 90.0 |
| Heat Stability (dimensional stability)*, % Change | Transverse Direction | D5147/ D1204 | +10 | +1.2 | +2 |
| | Parallel direction | | +6.4 | +1.6 | +1.2 |
| Force Ductility | Force ratio (f1/f2) | 25° C. | T 300M | 0.37 | 0.54 | 0.52 |
| | Deformation Energy, (J/cm2) | | | 3.2 | 5.4 | 6.0 |

FIG. 8 is a table of micrographs showing polymer fluorescence under ultraviolet (UV) light exposure for Control Formulation, Wax Blend Formulation 1, and Wax Blend Formulation 2. For highly modified asphalt, a phase inversion occurs and the asphalt (black areas) becomes the dispersed phase within the polymer phase. The compatibility is deemed satisfactory when a homogenous dispersion of the asphalt within the polymer matrix is achieved.

Figure 9:
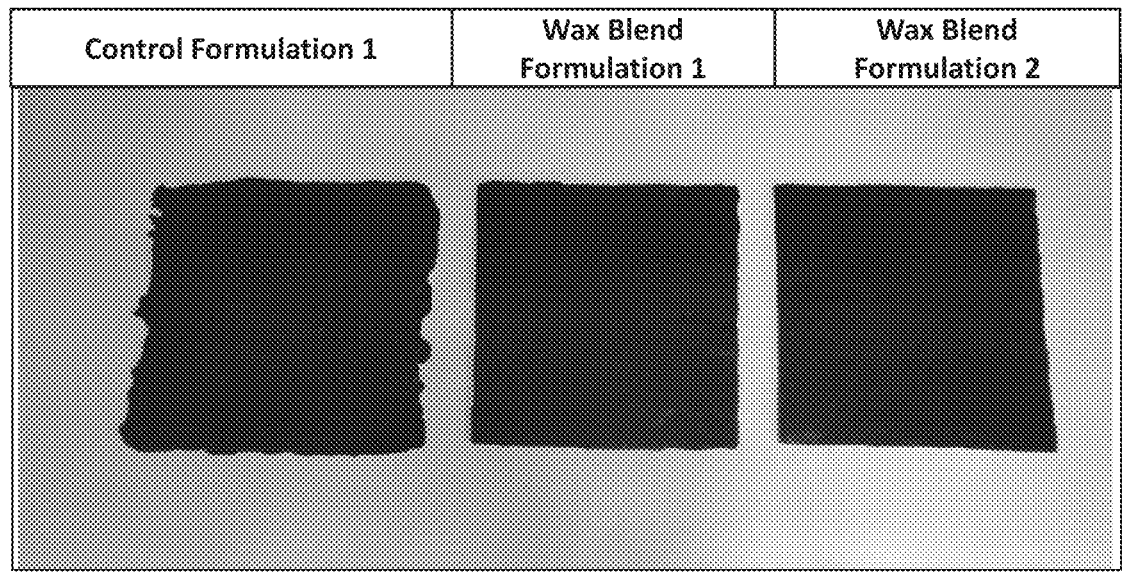
FIG. 9 is a set of photographs showing linear dimensional changes of 25 cm by 25 cm samples stored for 24 hrs at 80° C. for Control Formulation, Wax Blend Formulation 1, and Wax Blend Formulation 2.

FIG. 9 is a set of photographs showing linear dimensional changes of 25 cm by 25 cm samples stored for 24 hrs at 80° C. for Control Formulation, Wax Blend Formulation 1, and Wax Blend Formulation 2, in accordance with ASTM D1204.

Figure 10:
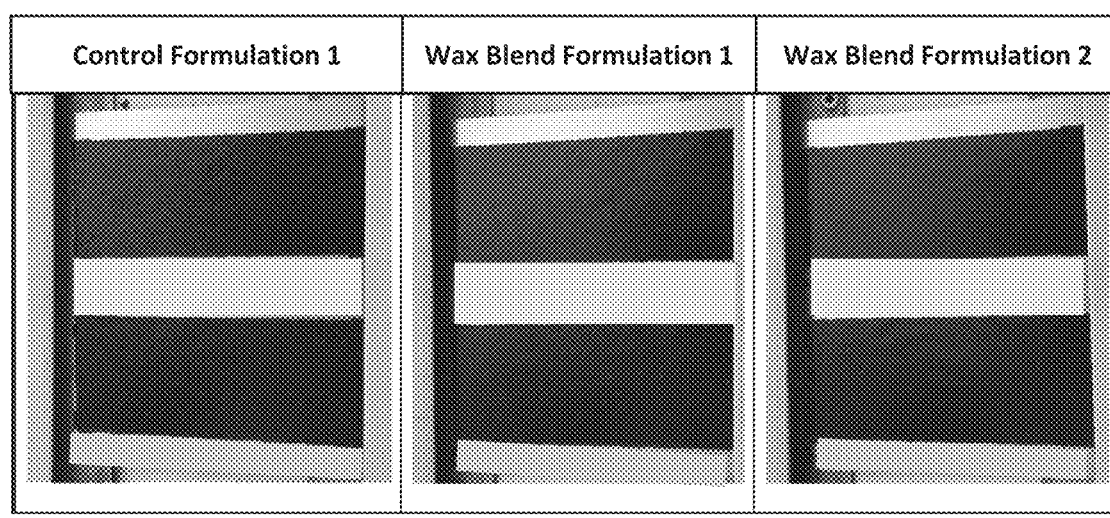
FIG. 10 is a set of photographs of weathering panels for Control Formulation, Wax Blend Formulation 1, and Wax Blend Formulation 2.

FIG. 10 is a set of photographs of weathering panels for Control Formulation, Wax Blend Formulation 1, and Wax Blend Formulation 2. The panels were monitored for visual changes to include wax exudation as well as dimensional changes and weight loss due to UV and/or thermal degradation of the polymer.

The following conclusions can be drawn from the foregoing test results:

The addition of both Wax 1 and Wax 2 reduces the mixing time necessary to achieve the optimum polymer dispersion (phase inversion) compared to the control Modified Bitumen (MB).

The addition of Wax Blend Formulations 1 and 2 increases the softening point and viscosity of the MB while reducing the penetration at 25° C. The increase in viscosity and reduction in penetration is typically not desirable and might be mitigated by a wax and SBS content adjustment.

The low temperature flexibility assessed by the Cold Temperature Mandrel Bending test was not affected by the addition of Wax Blend Formulations 1 and 2.

Both waxes significantly improved the heat stability at 80° C. of the MB compared to the control MB.

The elastomeric properties were reduced for Wax Blend Formulations 2 at 4° C., 10° C. and 20° C., but were maintained for Wax Blend Formulation 1 at 10° C. and 20° C. but reduced at 4° C.

The energy of deformation at 25° C. was significantly improved by the addition of both Wax Blend Formulations 1 and 2, as compared to the control MB.

The addition of both Wax Blend Formulations 1 and 2 reduced the storage stability of the filled MB compound.

Effect of Processing Conditions on the Characteristics and Performances of the Polymer Modified Bitumen (PMB) formulated with 2% of Wax 2

As set forth in Table 5 below, Control Formulation consisted of 90% by weight of Base Asphalt (PRI Stock: Mid Continent) and 10% by weight of SBS (Kraton D1101).

Wax Blend Formulation 3 (pre-polymer addition) consisted of 98% by weight of Base Asphalt (PRI Stock: Mid Continent), 0% by weight of SBS (Kraton D1101) and 2% by weight of Wax 2 (melting point 125° C.; produced by depolymerization of post-consumer polyethylene).

Wax Blend Formulation 3 (post-polymer addition) consisted of 88% by weight of Base Asphalt (PRI Stock: Mid Continent), 10% by weight of SBS (Kraton D1101) and 2% by weight of Wax 2 (melting point 125° C.; produced by depolymerization of post-consumer polyethylene).

TABLE 4

Sample Data

| Ingredient | Grade/Type | Source |
|---|---|---|
| Asphalt | 150/200 Penetration | PRI Stock: Mid Continent |
| SBS | SBS Linear | Kraton D1101 |
| Limestone | Limestone Filler | Tamko (Shingle Filler) |
| Wax | Wax 1 | Applicant |

The preparation of the Wax Blend Formulation 3 for testing in this example (unfilled and filled with limestone) was as follows:

(1) The asphalt was heated to 180° C.
(2) 2% of the wax blend formulation was added under agitation for 1 hour.
(3) 10% SBS was added to the asphalt while high sheared mixing condition was maintained for 30 minutes, then low shear agitation was established for the remaining of the mixing.
(4) During the maturation phase, aliquot samples were taken for microscopy fluorescence analysis.
(5) For the filled samples, 20% of limestone was added while low shear agitation was maintained during 1 h at 180° C.
(6) For Wax Blend Formulation 4, the wax was added 30 minutes after the polymer addition, in a manner similar the preparation of Wax Blend Formulations 1 and 2 previously discussed.

TABLE 5

Summary of Blends and Mix Times

| Ingredient | Source | Neat Bitumen | Wax Blend Formulation 3 (pre-polymer addition) | Wax Blend Formulation 3 (post-polymer addition) | Control Formulation |
|---|---|---|---|---|---|
| Base Asphalt, wt % | Phillips 66 | 100 | 98 | 88 | 90 |
| SBS, wt % | Kraton D1101 | 0 | 0 | 10 | 10 |
| Wax, wt % | Applicant | 0 | 0 | 2 | 0 |

| Property | Mix Time, hrs | Specification | Neat Bitumen | Wax Blend Formulation 3 (pre-polymer addition) | Wax Blend Formulation 3 (post-polymer addition) | Control Formulation |
|---|---|---|---|---|---|---|
| Fluorescence Microscopy | 2 | Achieve phase inversion and therefore full dispersion | — | undispersed | undispersed | undispersed |
| | 3 | | — | undispersed | undispersed | undispersed |
| | 4 | | — | undispersed | undispersed | undispersed |
| | 5 | | — | undispersed | undispersed | undispersed |
| | 6 | | — | undispersed | undispersed | undispersed |
| | 7 | | — | undispersed | undispersed | undispersed |
| | 8 | | — | fully dispersed | fully dispersed | undispersed |
| | 9 | | — | fully dispersed | fully dispersed | undispersed |
| | 10.5 | | — | fully dispersed | fully dispersed | fully dispersed |

TABLE 6

Polymer Modified Bitumen Properties

| Property | | | Test Method | Wax Blend Formulation 3 (pre-polymer addition) | Wax Blend Formulation 3 (post-polymer addition) | Wax Blend Formulation 2 | Control Formulation 1 |
|---|---|---|---|---|---|---|---|
| CTMB (Failure Temperature), ° C. | | | D5147M | −10.0 | −21.1 | −23.9 | −23.9 |
| Softening Point, ° C. | | | D36 | 104.2 | 101.4 | 105.8 | 93.6 |
| Penetration, dmm | | 4° C. | D5 | 34 | 41 | 34 | 41 |
| | | 25° C. | | 43 | 53 | 40 | 50 |
| | | 46° C. | | 99 | 134 | 60 | 90 |
| Elastic Recovery, % | | 4° C. | D6084 B | 85.8 | 77.5 | 56.3 | 76.2 |
| | | 10° C. | | 87.5 | 83.3 | 90.0 | 90 |
| | | 25° C. | | 97.5 | 96.8 | 95.0 | 95 |
| Heat Stability (dimensional stability), % Change | Transverse Direction | 80° C. | D5147/D1204 | +0.4 | +2.0 | +1.2 | +10 |
| | Parallel direction | | | +0.8 | +2.0 | +1.6 | +6.4 |
| Force Ductility | Force ratio (f1/f2) | 25° C. | T 300M | 0.29 | 0.18 | 0.54 | 0.37 |
| | Deformation Energy, (J/cm2) | | | 4.51 | 3.14 | 5.4 | 3.2 |

FIG. 11 is a table of micrographs showing polymer fluorescence under ultraviolet (UV) light exposure for Control Formulation, Wax Blend Formulation 3 (pre-polymer addition), and Wax Blend Formulation 3 (post-polymer addition). For highly modified asphalt, a phase inversion occurs and the asphalt (black areas) becomes the dispersed phase within the polymer phase. The compatibility is deemed satisfactory when a homogenous dispersion of the asphalt within the polymer matrix is achieved.

Figure 12:
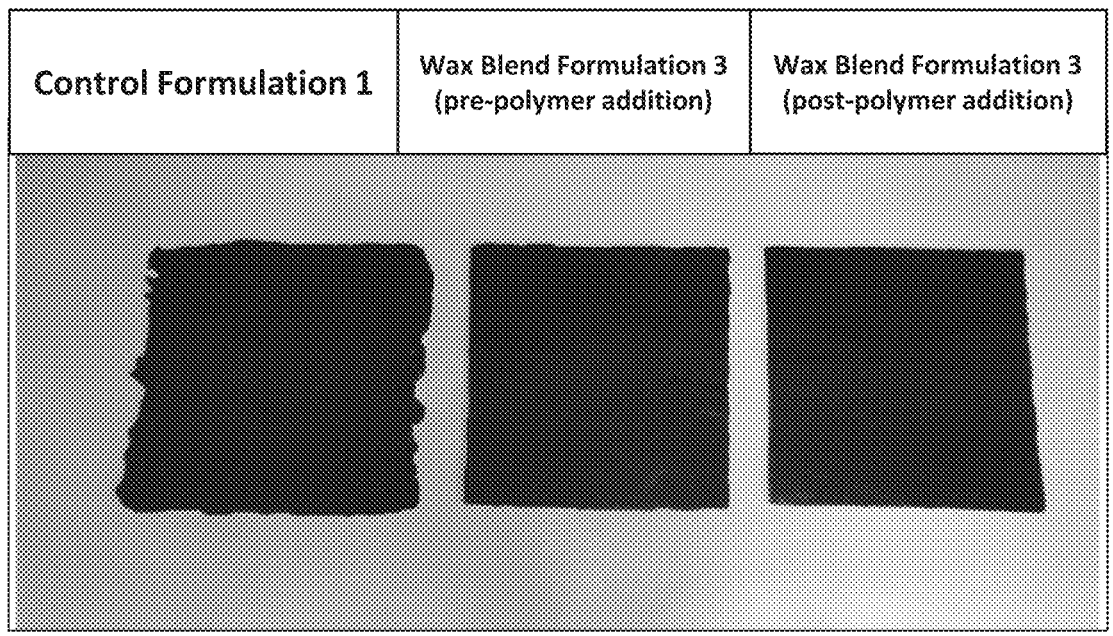
FIG. 12 is a set of photographs showing linear dimensional changes of 25 cm by 25 cm samples stored for 24 hrs at 80° C. for Control Formulation, Wax Blend Formulation 3 (pre-polymer addition), and Wax Blend Formulation 3 (post-polymer addition).

FIG. 12 is a set of photographs showing linear dimensional changes of 25 cm by 25 cm samples stored for 24 hrs at 80° C. for Control Formulation, Wax Blend Formulation 3 (pre-polymer addition), and Wax Blend Formulation 3, in accordance with ASTM D1204. The polymer added to Wax Blend Formulation 3 was poly(styrene-butadiene-styrene) (SBS).

Figure 13:
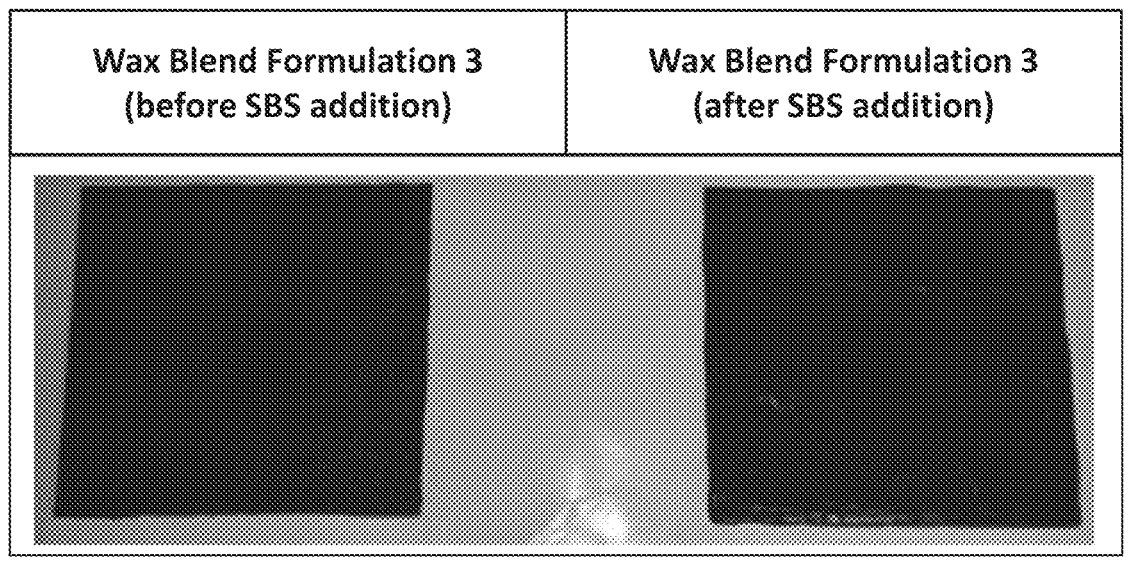
FIG. 13 is a pair of photographs showing linear dimensional changes of 25 cm by 25 cm samples stored for 24 hrs at 80° C. for Wax Blend Formulation 3 (pre-polymer addition) and Wax Blend Formulation 3 (post-polymer addition).
Figure 14:
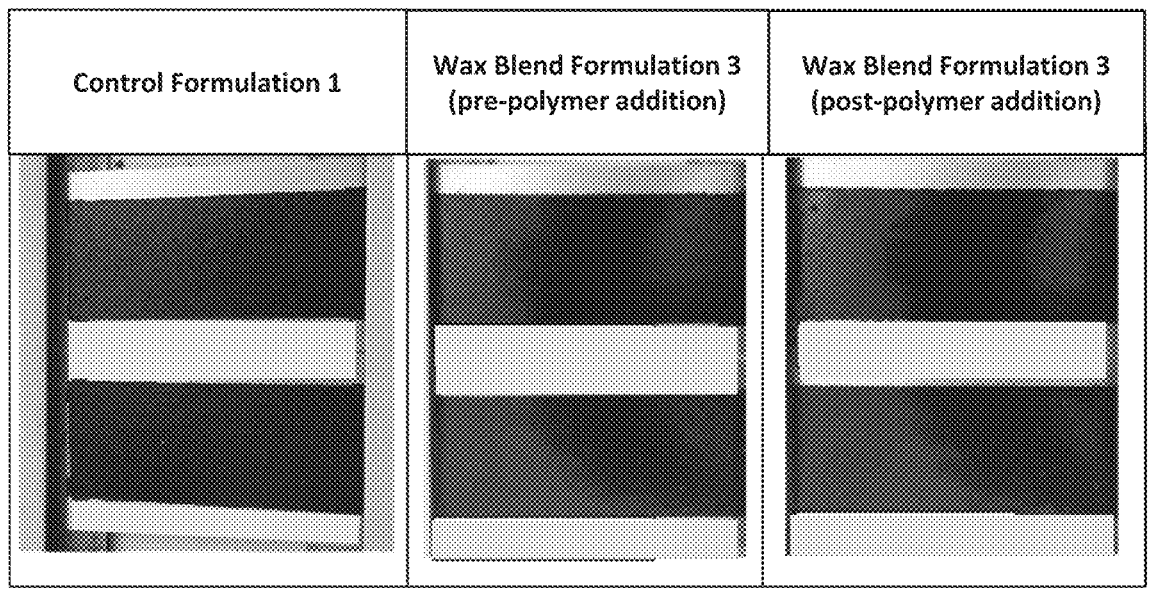
FIG. 14 is a set of photographs of weathering panels for Control Formulation, Wax Blend Formulation 3 (pre-polymer addition) and Wax Blend Formulation 3 (post-polymer addition).

FIG. 13 is a pair of photographs showing linear dimensional changes of 25 cm by 25 cm samples stored for 24 hrs at 80° C. for Wax Blend Formulation 3 (pre-polymer addition) and Wax Blend Formulation 3 (post-polymer addition). The polymer added to Wax Blend Formulation 3 was SBS.

FIG. 16 is a set of photographs of weathering panels for Control Formulation, Wax Blend Formulation 3 (pre-polymer addition) and Wax Blend Formulation 3 (post-polymer addition). The panels were monitored for visual changes to include wax exudation as well as dimensional changes and weight loss due to UV and/or thermal degradation of the polymer.

Figure 15:
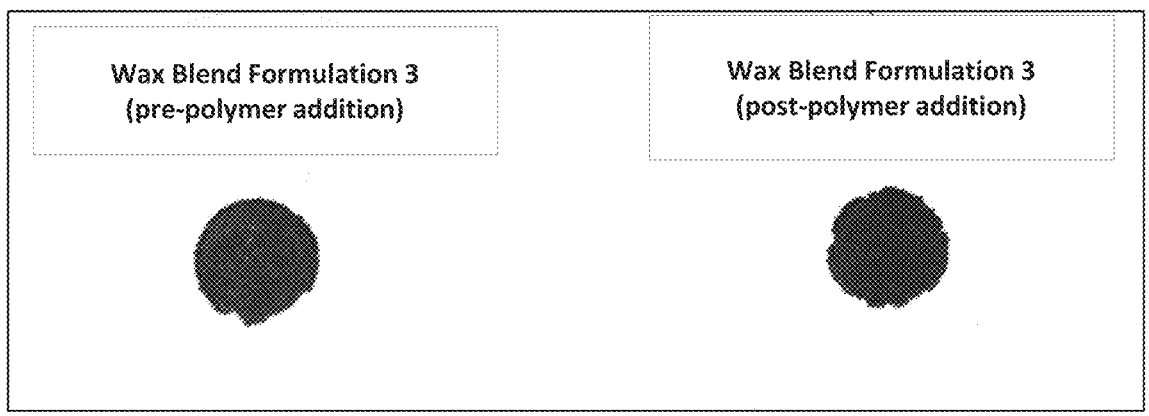
FIG. 15 is a pair of photographs showing the results of a Stain Index test (ASTM D2746) for Wax Blend Formulation 3 (pre-polymer addition) and Wax Blend Formulation 3 (post-polymer addition).

FIG. 15 is a pair of photographs showing the results of a Stain Index test (ASTM D2746) for Wax Blend Formulation 3 (pre-polymer addition) and Wax Blend Formulation 3 (post-polymer addition). The Stain Index test measures the tendency for oil components to separate spontaneously from asphalt. The separation of oil components can cause staining in asphalt roofing products and adjacent materials in storage and use. The results show no staining in comparison to the control, which is expected due to the wax improving thermal stability of the asphalt.

The following conclusions can be drawn from the foregoing test results:

(1) The addition of Wax 2 in Wax Blend Formulation 3:
   (a) reduced the mixing time necessary to achieve the optimum polymer dispersion (phase inversion) compared to Control Formulation Modified Bitumen (MB) previously tested.
   (b) reduced slightly the viscosity of the neat bitumen.
(2) The order of addition of the wax had a significant impact on the product characteristics and performances:
   (a) The pre-polymer addition process was detrimental to all properties except for the softening point, the elastomeric and cohesion properties and the dimensional stability.
   (b) The post-polymer addition process improved a series of properties over the control blend:
      (i) Viscosity reduction
      (ii) Higher softening point
      (iii) Improved dimensional stability.
(3) No noticeable stain formation was detected for both of Wax Blend Formulation 3 (pre-polymer addition) and Wax Blend Formulation 3 (post-polymer addition).

While particular elements, embodiments and applications of the present invention have been shown and described, it will be understood, that the invention is not limited thereto since modifications can be made without departing from the scope of the present disclosure, particularly in light of the foregoing teachings.

What is claimed is:

1. A method for forming a wax and employing said wax to modify asphalt, the method comprising:
   (a) selecting a solid polymeric material;
   (b) heating said solid polymeric material in an extruder to produce a molten polymeric material;
   (c) filtering said molten polymeric material;
   (d) placing said molten polymeric material through a chemical depolymerization process in a reactor to produce a depolymerized wax material;
   (e) adding said depolymerized wax material to a pre-wax mixture to produce a polymer-modified asphalt.

2. The method of claim 1, wherein said method is continuous or semi-continuous.

3. The method of claim 1, wherein said polymeric material is one or more of high-density polyethylene, low density polyethylene, linear low-density polyethylene and polypropylene.

4. The method of claim 1, wherein said polymeric material contains recycled plastics.

5. The method of claim 1, wherein said polymeric material and said pre-wax mixture contain recycled plastics.

6. The method of claim 1, further comprising:
   (f) filtering said solid polymeric material.

7. The method of claim 1, further comprising:
   (f) cooling said depolymerized polymeric material.

8. The method of claim 7, further comprising:
   (g) purifying said depolymerized polymeric material.

9. The method of claim 8, wherein said purifying step employs one of flash separation, absorbent beds, clay polishing and film evaporators.

10. The method of claim 1, wherein said depolymerized material is added to said pre-wax mixture via an in-line pump.

11. The method of claim 1, wherein said pre-wax mixture comprises said solid polymeric material and atactic polypropylene.

12. The method of claim 1, further comprising:
   (f) employing gas and oil produced during purification of said depolymerized polymeric material as fuel for at least one step of said method.

13. The method of claim 6, wherein said filtering step employs a screen changer.

14. The method of claim 6, wherein said filtering step employs a filter bed.

15. The method of claim 1, wherein said depolymerization process employs a catalyst.

16. The method of claim 15, wherein said catalyst is supported on zeolite or alumina.

17. The method of claim 1, wherein said depolymerization process employs a second reactor.

18. The method of claim 17, wherein said reactors are connected in series.

19. The method of claim 17, wherein said reactors are stacked vertically.

20. The method of claim 1, wherein said reactor comprises a static mixer.

* * * * *